(12) United States Patent
Aragai et al.

(10) Patent No.: US 9,308,820 B2
(45) Date of Patent: Apr. 12, 2016

(54) POWER-SUPPLY CONTROL DEVICE

(71) Applicants: Takashi Aragai, Aichi (JP); Yusuke Ukai, Aichi (JP); Hirohito Miyazaki, Gifu (JP)

(72) Inventors: Takashi Aragai, Aichi (JP); Yusuke Ukai, Aichi (JP); Hirohito Miyazaki, Gifu (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 575 days.

(21) Appl. No.: 13/771,903

(22) Filed: Feb. 20, 2013

(65) Prior Publication Data

US 2013/0214592 A1 Aug. 22, 2013

(30) Foreign Application Priority Data

Feb. 20, 2012 (JP) ................................ 2012-033745

(51) Int. Cl.
| | |
|---|---|
| *B60L 1/00* | (2006.01) |
| *B60L 3/00* | (2006.01) |
| *H02G 3/00* | (2006.01) |
| *B60R 16/03* | (2006.01) |

(52) U.S. Cl.
CPC .. *B60L 1/00* (2013.01); *B60R 16/03* (2013.01)

(58) Field of Classification Search
CPC .................................. B60R 16/03; B60L 1/00
USPC .......................................................... 307/9.1
See application file for complete search history.

(56) References Cited

U.S. PATENT DOCUMENTS

| | | | |
|---|---|---|---|
| 5,508,878 A | * | 4/1996 | Pecore ................... G04G 15/00 307/140 |
| 6,144,110 A | | 11/2000 | Matsuda et al. |
| 6,347,030 B1 | | 2/2002 | Matsuura |
| 7,265,457 B2 | | 9/2007 | Yasui et al. |

(Continued)

FOREIGN PATENT DOCUMENTS

| | | | |
|---|---|---|---|
| JP | 03112031 | * | 5/1991 |
| JP | H03-112031 A | | 5/1991 |

(Continued)

OTHER PUBLICATIONS

Notification of Reasons for Refusal in counterpart Japanese Patent Application No. 2012-033745 issued on Apr. 22, 2014 (9 pages).

(Continued)

*Primary Examiner* — Thienvu Tran
*Assistant Examiner* — Toan Vu
(74) *Attorney, Agent, or Firm* — Osha Liang LLP

(57) ABSTRACT

An electric power is surely supplied to a load even if an abnormality is generated in a switching control circuit, which controls a switching part that switches electric connection between a power supply and the load of a vehicle. The switching control circuit controls a state of a contact of a keep relay that switches the electric connection between the power supply and the load. A monitor circuit monitors existence or non-existence of the abnormality of the switching control circuit. When detecting the abnormality of the switching control circuit, the monitor circuit transmits a reset signal in order to reset a state of the switching control circuit. When receiving the reset signal from the monitor circuit, an abnormal-time connection circuit transmits a connection signal to a coil of the keep relay to bring a movable contact into contact with a contact. For example, the present invention can be applied to a power-supply control device for the vehicle.

14 Claims, 10 Drawing Sheets

(56) References Cited

U.S. PATENT DOCUMENTS

2004/0263347 A1 12/2004 Yasui et al.
2011/0193414 A1 8/2011 Furuichi et al.

FOREIGN PATENT DOCUMENTS

| JP | 10-271698 A | 10/1998 |
| JP | 2000-050513 A | 2/2000 |
| JP | 2003-063330 A | 3/2003 |
| JP | 2003-235155 A | 8/2003 |
| JP | 2008-290604 A | 12/2008 |
| JP | 2009-003663 A | 1/2009 |
| JP | 2010-178558 A | 8/2010 |
| JP | 2011-024299 A | 2/2011 |

OTHER PUBLICATIONS

Office Action issued in counterpart Japanese Patent Application No. 2012-033637 dated Jun. 5, 2014 (11 pages).
Patent Abstracts of Japan for Japanese Publication No. 2008-290604, publication date Dec. 4, 2008 (1 page).

* cited by examiner

POWER-SUPPLY CONTROL DEVICE

CROSS-REFERENCE TO RELATED APPLICATIONS

The present application claims priority from Japanese Patent Application No. 2012-033745, filed Feb. 20, 2012. The content of the priority application is hereby incorporated by reference in its entirety.

BACKGROUND OF INVENTION

1. Field of the Invention

One or more embodiments of the present invention relates to a power-supply control device, particularly to a power-supply control device that controls supply of an electric power to a vehicle load.

2. Background Art

For example, Japanese Unexamined Patent Publication Nos. 2008-290604 and 2003-235155 disclose a technology, in which a keep relay is provided between a battery and the load (for example, an ECU) of the vehicle and the keep relay is opened by a predetermined manipulation to prevent a discharge of a battery due to passage of a dark current during transportation of the vehicle or long-term parking.

However, in the technology disclosed in Japanese Unexamined Patent Publication Nos. 2008-290604 and 2003-235155, in usual states, such as vehicle running, possibly an abnormality is generated in a switching control circuit that controls a contact of the keep relay, and the keep relay is opened to be not able to supply the electric power to the load. Unless the electric power is supplied to the load, for example, information stored in a memory of the ECU is erased, and the loads, such as a lamp and a wiper, which are connected to the ECU, cannot be driven, which possibly results in a risk of adversely affecting the vehicle running.

SUMMARY OF INVENTION

One or more embodiments of the present invention may be able to surely supply the electric power to the load even if the abnormality is generated in the switching control circuit that controls switching part switching the electric connection between the power supply and the load of the vehicle.

In accordance with one aspect of the present invention, a power-supply control device that controls supply of an electric power from a power supply of a vehicle to a load of the vehicle by controlling a switching part, the switching part switching electric connection between the power supply and the load, the switching part becoming a first state in which the power supply is electrically connected to the load when a first control signal is transmitted, the switching part becoming a second state in which the power supply is electrically disconnected from the load when a second control signal is transmitted, the switching part being able to retain the state even if the supply of the control signal is stopped, the power-supply control device includes: a switching control circuit that supplies the first control signal and the second control signal to the switching part to control the state of the switching part; a monitor circuit that monitors existence or non-existence of an abnormality of the switching control circuit, and transmits a reset signal to the switching control circuit in order to reset the state of the switching control circuit when detecting the abnormality of the switching control circuit; and an abnormal-time connection circuit that transmits a third control signal to the switching part in order to set the switching part to the first state when the monitor circuit transmits the reset signal to the switching control circuit.

In the power-supply control device in accordance with one aspect of the present invention, the switching part switches the electric connection between the power supply and the load of the vehicle, the switching part becomes the first state in which the power supply is electrically connected to the load when the first control signal is transmitted, the switching part becomes the second state in which the power supply is electrically disconnected from the load when the second control signal is transmitted, and the switching part is able to retain the state even if the transmission of the control signal is stopped. The first and second control signals are transmitted to the switching part, and the existence or non-existence of the abnormality of the switching control circuit which controls the state of the switching part is monitored. When the abnormality of the switching control circuit is detected, the reset signal is transmitted to the switching control circuit in order to reset the state of the switching control circuit, and the third control signal is transmitted to the switching part in order to set the switching part to the first state.

Accordingly, the electric power can surely be supplied to the load even if the abnormality is generated in the switching control circuit that controls switching part switching the electric connection between the power supply and the load of the vehicle.

For example, the switching part is constructed by a keep relay or a combination of a latch IC and a switching element. For example, the switching control circuit is constructed by an electric circuit in which a processor, such as a CPU, or an arithmetic device and a switching element are used. For example, the monitor circuit is constructed by a WDT IC. For example, the abnormal-time connection circuit is constructed by an electric circuit in which the switching element is used.

In the power-supply control device, the reset signal may be a pulsed signal, and the abnormal-time connection circuit transmits the third control signal to the switching part after the plural pulsed reset signals are transmitted.

Therefore, the false start of the supply of the electric power to the load due to a noise is prevented.

The power-supply control device may further include an electric-power supply monitor circuit that is connected between the switching part and the load, and transmits a signal, which indicates existence or non-existence of the electric power supplied from the power supply to the load, to the switching control circuit while the switching control circuit transmits a fourth control signal.

Therefore, the supply of the electric power to the load can be checked as needed basis, and power consumption can be suppressed.

For example, the electric-power supply monitor circuit is constructed by an electric circuit in which the switching element is used.

The power-supply control device may further include an automatic stopping circuit that is connected between the switching part and the load, and stops the third control signal output from the abnormal-time connection circuit using a voltage or a current, which is supplied from the switching part to the load.

Therefore, the power consumption of the switching part can be suppressed.

The power-supply control device may further include a switching part.

In the power-supply control device, the switching part may include a relay that can retain a state of a contact even if the transmission of the control signal is stopped, the first state is a state in which the relay electrically connects the power supply to the load, and the second state is a state in which the relay electrically disconnects the power supply from the load.

Therefore, the switching part can be constructed by the simple configuration.

For example, the relay is constructed by a keep relay.

In the power-supply control device, the switching control circuit may include: a connection circuit that is connected to the power supply, and supplies the electric power from the power supply to the relay as the first control signal when a fifth control signal is transmitted; a disconnection circuit that is connected to the power supply, and supplies the electric power from the power supply to the relay as the second control signal when a sixth control signal is transmitted; and a control part that controls the state of the relay by transmitting the fifth control signal to the connection circuit or transmitting the sixth control signal to the disconnection circuit.

Therefore, for example, the large-power-consumption relay that is hardly controlled by the control part, such as the CPU, can be controlled.

For example, the connection circuit and the disconnection circuit are constructed by an electric circuit in which the switching element is used. For example, the control part is constructed by the processor, such as the CPU, or the arithmetic device.

In the power-supply control device, the sixth control signal may be a pulsed signal, and the disconnection circuit transmits the second control signal to the relay after the plural pulsed sixth control signals are transmitted.

Therefore, the false stop of the supply of the electric power to the load due to the noise is prevented.

In the power-supply control device, the switching circuit may include a keep relay that becomes the first state when the control signal is simultaneously transmitted to a connection-side coil and a disconnection-side coil.

Therefore, the electric power can securely be supplied to the load even if the control signal is simultaneously transmitted to the connection-side coil and the disconnection-side coil.

According to one aspect of the present invention, the electric power can surely be supplied to the load even if the abnormality is generated in the switching control circuit that controls switching part switching the electric connection between the power supply and the load of the vehicle.

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention. Hereinafter, embodiments of the present invention will be described. The description is made as follows.

1. First embodiment (example in which keep relay is used as switching means)

2. Second embodiment (example in which latch IC and switching element are used as switching means)

3. Modifications

1. First Embodiment

A first embodiment of the present invention will be described with reference to FIGS. 1 to 8.

[Configuration Example of Power-Supply Control Device 101]

Figure 1:
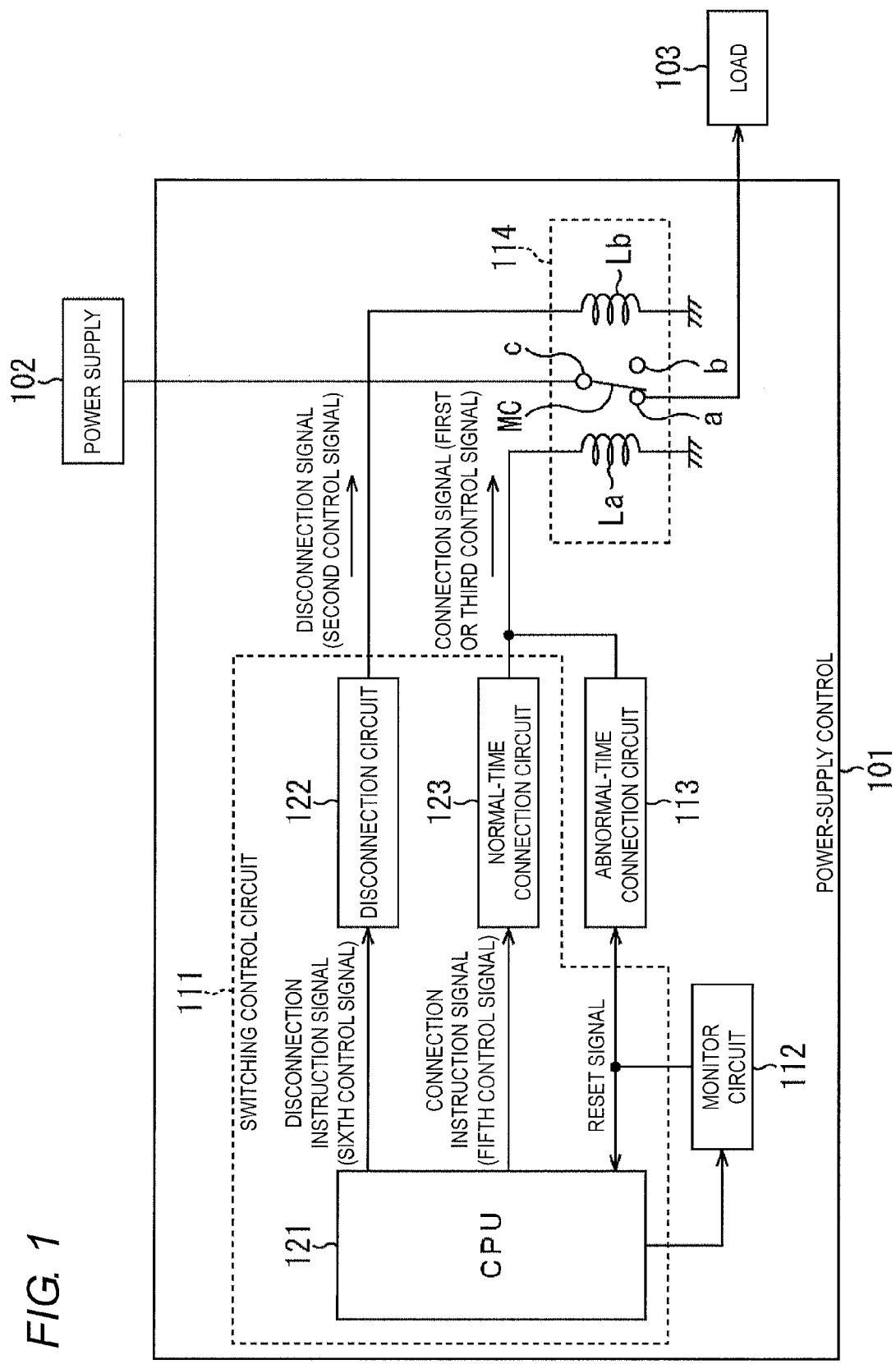
FIG. 1 is a block diagram illustrating a power-supply control device according to a first embodiment of the present invention.

FIG. 1 is a block diagram illustrating a power-supply control device 101 that is of a basic configuration example of the first embodiment of the present invention.

For example, the power-supply control device 101 is provided in a vehicle, and supplies an electric power from a power supply 102 to a load 103 of the vehicle. For example, the power-supply control device 101 is used to control a power supply system (what is called a continuous power supply or a +B power supply) that supplies the electric power to the load 103, in which basically the supply of the electric power is always required except the transportation or the long-period parking, from the power supply 102.

For example, the power supply 102 is constructed by a battery.

As described above, the load 103 is the load in which basically the supply of the electric power from the power supply 102 is always required. For example, the load 103 is constructed by an ECU (Electronic Control Unit).

The power-supply control device 101 includes a switching control circuit 111, a monitor circuit 112, an abnormal-time connection circuit 113, and a keep relay 114.

The switching control circuit 111 controls the supply of the electric power from the power supply 102 to the load 103 by controlling a state of a contact of the keep relay 114.

Specifically, the switching control circuit 111 includes a CPU 121, a disconnection circuit 122, and a normal-time connection circuit 123. In the case that the supply of the electric power from the power supply 102 to the load 103 is stopped, the CPU 121 transmits a control signal (hereinafter referred to as a disconnection instruction signal) to the disconnection circuit 122 in order to issue an instruction to electrically disconnect the power supply 102 from the load 103. When receiving the disconnection instruction signal, the disconnection circuit 122 transmits a control signal (hereinafter referred to as a disconnection signal) to a coil Lb of the keep relay 114 to bring a movable contact MC of the keep relay 114 into contact with a contact b. Therefore, the power supply 102 is electrically disconnected from the load 103 to stop the supply of the electric power from the power supply 102 to the load 103.

In the case that the supply of the electric power from the power supply 102 to the load 103 is started, the CPU 121 transmits a control signal (hereinafter referred to as a connection instruction signal) to the normal-time connection circuit 123 in order to issue an instruction to electrically connect the power supply 102 to the load 103. When receiving the connection instruction signal, the normal-time connection circuit 123 transmits a control signal (hereinafter referred to as a connection signal) to a coil La of the keep relay 114 to bring the movable contact MC of the keep relay 114 into contact with a contact a. Therefore, the power supply 102 is electrically connected to the load 103 to start the supply of the electric power from the power supply 102 to the load 103.

When the connection signal to the coil La and the disconnection signal to the coil Lb are simultaneously transmitted, the movable contact MC of the keep relay 114 comes into contact with the contact a.

The monitor circuit 112 monitors existence or non-existence of an abnormality of the switching control circuit 111 (more specifically, the CPU 121). When detecting the abnormality of the switching control circuit 111, the monitor circuit 112 transmits a reset signal to the switching control circuit 111 and the abnormal-time connection circuit 113 in order to reset the switching control circuit 111 to an initial state.

When receiving the reset signal from the monitor circuit 112, the abnormal-time connection circuit 113 transmits the connection signal to the coil La of the keep relay 114 to bring the movable contact MC of the keep relay 114 into contact with the contact a. Therefore, the power supply 102 is electrically connected to the load 103 to start the supply of the electric power from the power supply 102 to the load 103.

The keep relay 114 is constructed by a two-winding type keep relay including the coil La and the coil Lb. In the keep relay 114, when the connection signal is transmitted to the coil La for a predetermined time (more strictly, when a predetermined voltage is applied to the coil La to pass an excitation current through the coil La for a predetermined time), the movable contact MC comes into contact with the contact a, and retains the contact state even after the transmission of the connection signal is stopped. Therefore, the power supply 102 is electrically connected to the load 103 to maintain the supply of the electric power from the power supply 102 to the load 103.

In the keep relay 114, when the disconnection signal is transmitted to the coil Lb for a predetermined time (more strictly, when a predetermined voltage is applied to the coil Lb to pass an excitation current through the coil Lb for a predetermined time), the movable contact MC comes into contact with the contact b, and retains the contact state even after the transmission of the disconnection signal is stopped. Therefore, the power supply 102 is electrically disconnected from the load 103 to maintain the stopping state of the supply of the electric power from the power supply 102 to the load 103.

Hereinafter, the state, in which the power supply 102 is electrically connected to the load 103 while the movable contact MC of the keep relay 114 is in contact with the contact a, is referred to as a connection state. Hereinafter, the state, in which the power supply 102 is electrically disconnected from the load 103 while the movable contact MC of the keep relay 114 is in contact with the contact b, is referred to as a disconnection state.

[Configuration Example of Power-Supply Management ECU 201]

Figure 2:
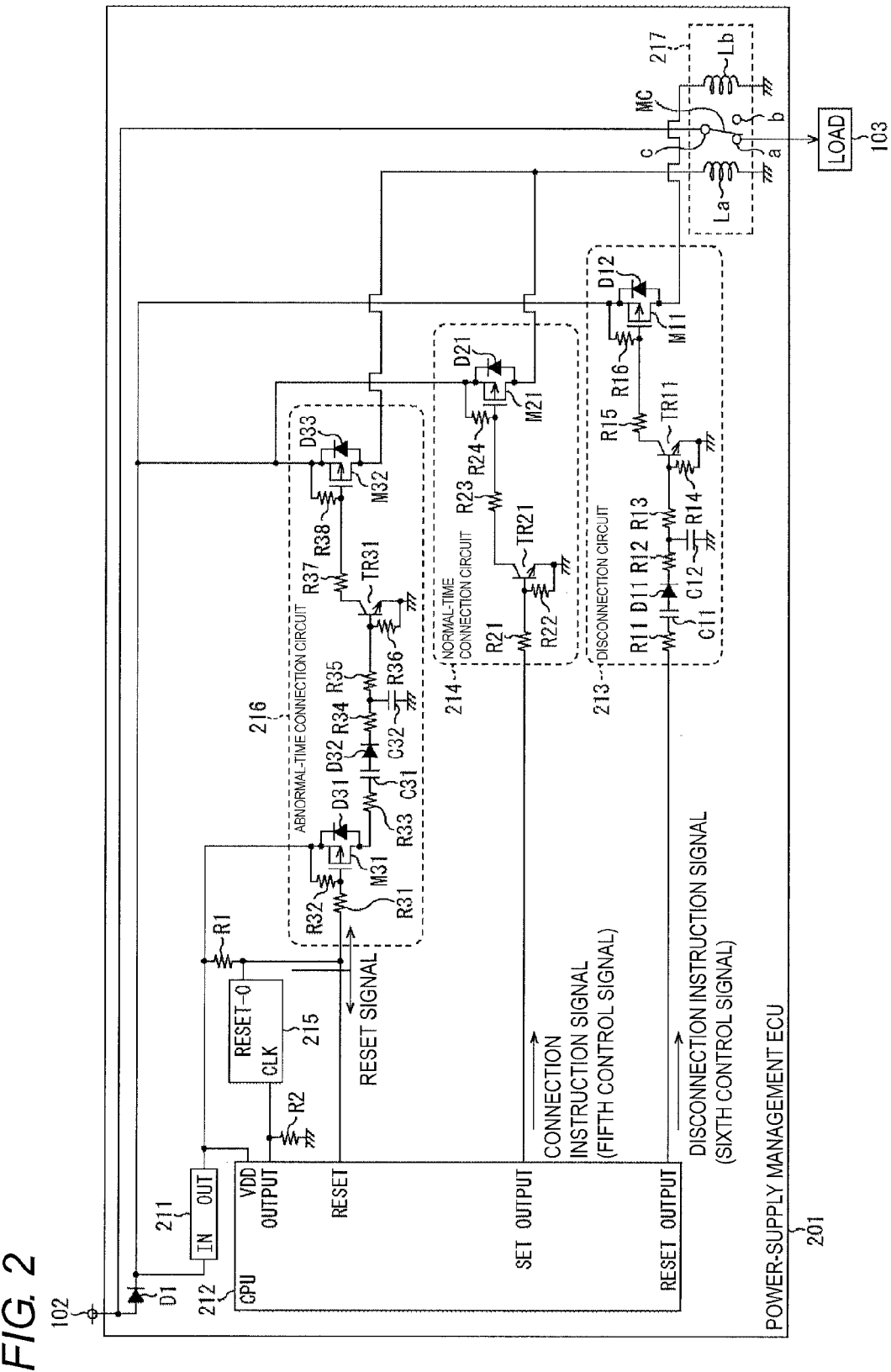
FIG. 2 is a circuit diagram illustrating a power-supply management ECU of a first specific example.

FIG. 2 is a circuit diagram illustrating a configuration example of a power-supply management ECU (Electronic Control Unit) 201 that is of a first specific example of the power-supply control device 101 in FIG. 1.

The power-supply management ECU 201 includes a voltage regulator 211, a CPU (Central Processing Unit) 212, a disconnection circuit 213, a normal-time connection circuit 214, a monitor circuit 215, an abnormal-time connection circuit 216, a keep relay 217, a diode D1, and resistors R1 and R2.

The power supply 102 is connected to an anode of the diode D1 and a terminal c of the keep relay 217. A cathode of the diode D1 is connected to an input terminal (IN) of the voltage regulator 211, a source of a MOSFET M11 of the disconnection circuit 213, a source of a MOSFET M21 of the normal-time connection circuit 214, and a source of a MOSFET M32 of the abnormal-time connection circuit 216.

An output terminal (OUT) of the voltage regulator 211 is connected to a power supply terminal (VDD) of the CPU 212, one end of the resistor R1, and a source of a MOSFET M31 of the abnormal-time connection circuit 216. The voltage regulator 211 converts a voltage (for example, DC12 V) of the electric power supplied from the power supply 102 into a predetermined voltage (for example, DC5 V), and supplies the converted voltage to the CPU 212 and the abnormal-time connection circuit 216.

A reset output terminal (RESET OUTPUT) of the CPU 212 is connected to one end of a resistor R11 of the disconnection circuit 213. In the case that the supply of the electric power from the power supply 102 to the load 103 is stopped, the pulsed disconnection instruction signal is continuously output from the reset output terminal, and transmitted to the disconnection circuit 213.

A set output terminal (SET OUTPUT) of the CPU 212 is connected to one end of a resistor R21 of the normal-time connection circuit 214. In the case that the supply of the electric power from the power supply 102 to the load 103 is started, the single pulsed connection instruction signal is output from the set output terminal, and transmitted to the normal-time connection circuit 214.

An output terminal (OUTPUT) of the CPU 212 is connected to a clock terminal (CLK) of the monitor circuit 215. One end of the resistor R2 is connected between the output terminal of the CPU 212 and the clock terminal of the monitor circuit 215, and the other end is connected to a ground. In the case that the CPU 212 is normally operated, a single pulsed clear signal is periodically output from the output terminal of the CPU 212, and transmitted to the monitor circuit 215. On the other hand, the output of the clear signal is stopped in the case that the abnormality is generated in the CPU 212.

A reset terminal (RESET) of the CPU 212 is connected to a reset output terminal (RESET-O) of the monitor circuit 215, one end of the resistor R1, which is opposite to the end connected to the voltage regulator 211, and one end of a resistor R31 of the abnormal-time connection circuit 216. When a pulsed reset signal is input to the reset terminal from the monitor circuit 215, the CPU 212 is reset to the initial state by performing restart.

The disconnection circuit 213 includes resistors R11 to R16, capacitors C11 and C12, diodes D11 and D12, an NPN-type transistor TR11, and the P-type MOSFET M11.

The resistor R11 and the capacitor C11 are connected in series between the reset output terminal of the CPU 212 and the anode of the diode D11. The resistors R12 and R13 are connected in series between the cathode of the diode D11 and a base of the transistor TR11. One end of the capacitor C12 is connected between the resistors R12 and R13, and the other end is connected to the ground. A collector of the transistor TR11 is connected to a gate of the MOSFET M11 through the resistor R15, an emitter of the transistor TR11 is connected to the ground, and the resistor R14 is connected between the base and the emitter. A drain of the MOSFET M11 is connected to the anode of the diode D12 and one end of the coil Lb of the keep relay 217, a source of the MOSFET M11 is connected to the cathode of the diode D12, and the resistor R16 is connected between the gate and the source.

An operation of the disconnection circuit 213 is described later.

The normal-time connection circuit 214 includes resistors R21 to R24, a diode D21, an NPN-type transistor TR21, and the P-type MOSFET M21.

The base of the transistor TR21 is connected to the set output terminal of the CPU 212 through the resistor R21, the collector is connected to the gate of the MOSFET M21 through the resistor R23, and the emitter is connected to the ground, and the resistor R22 is connected between the base and the emitter. The drain of the MOSFET M21 is connected to the anode of the diode D21 and one end of the coil La of the keep relay 217, the source of the MOSFET M21 is connected to the cathode of the diode D21, and the resistor R24 is connected between the gate and the source.

An operation of the normal-time connection circuit 214 is described later.

For example, the monitor circuit 215 is constructed by a WDT (watchdog timer) IC. The monitor circuit 215 is provided with a counter inside, and always performs counting during the operation. When the clear signal is input to the clock terminal from the CPU 212, the monitor circuit 215 resets the counter to restart the counting from the beginning.

On the other hand, when a value of the counter exceeds a predetermined threshold while the clear signal is not input from the CPU 212 for a predetermined time, the monitor circuit 215 outputs the pulsed reset signal having a negative-true logic (low active) from the reset output terminal, and transmits the pulsed reset signal to the reset terminal of the CPU 212 and the abnormal-time connection circuit 216. Then the monitor circuit 215 stops the output of the clear signal, resets the counter, and restarts the counting from the beginning.

The abnormal-time connection circuit 216 includes resistors R31 to R38, capacitors C31 and C32, diodes D31 to D33, an NPN-type transistor TR31, and the P-type MOSFETs M31 and M32.

The gate of the MOSFET M31 is connected to the reset terminal of the CPU 212 through the resistor R31, the drain is connected to the anode of the diode D31, the source is connected to the cathode of the diode D31, and the resistor R32 is connected between the gate and the source. The resistor R33 and the capacitor C31 are connected in series between the drain of the MOSFET M31 and the anode of the diode D32. The resistors R34 and R35 are connected in series between the cathode of the diode D32 and the base of the transistor TR31. One end of the capacitor C32 is connected between the resistors R34 and R35, and the other end is connected to the ground.

The collector of the transistor TR31 is connected to the gate of the MOSFET M32 through the resistor R37, the emitter is connected to the ground, and the resistor R36 is connected between the base and the emitter. The drain of the MOSFET M32 is connected to the cathode of the diode D33 and one end of the coil La of the keep relay 217, the source is connected to the anode of the diode D33, and the resistor R38 is connected between the gate and the source.

An operation of the abnormal-time connection circuit 216 is described later.

The keep relay 217 has the same configuration as the keep relay 114 in FIG. 1. One end of the coil La of the keep relay 217, which is opposite to the end connected to the normal-time connection circuit 214 and the abnormal-time connection circuit 216, is connected to the ground. One end of the coil Lb, which is opposite to the end connected to the disconnection circuit 213, is connected to the ground. The load 103 is connected to the contact a of the keep relay 217, and nothing is connected to the contact b.

[Operation of Power-Supply Management ECU 201]

Figure 3:
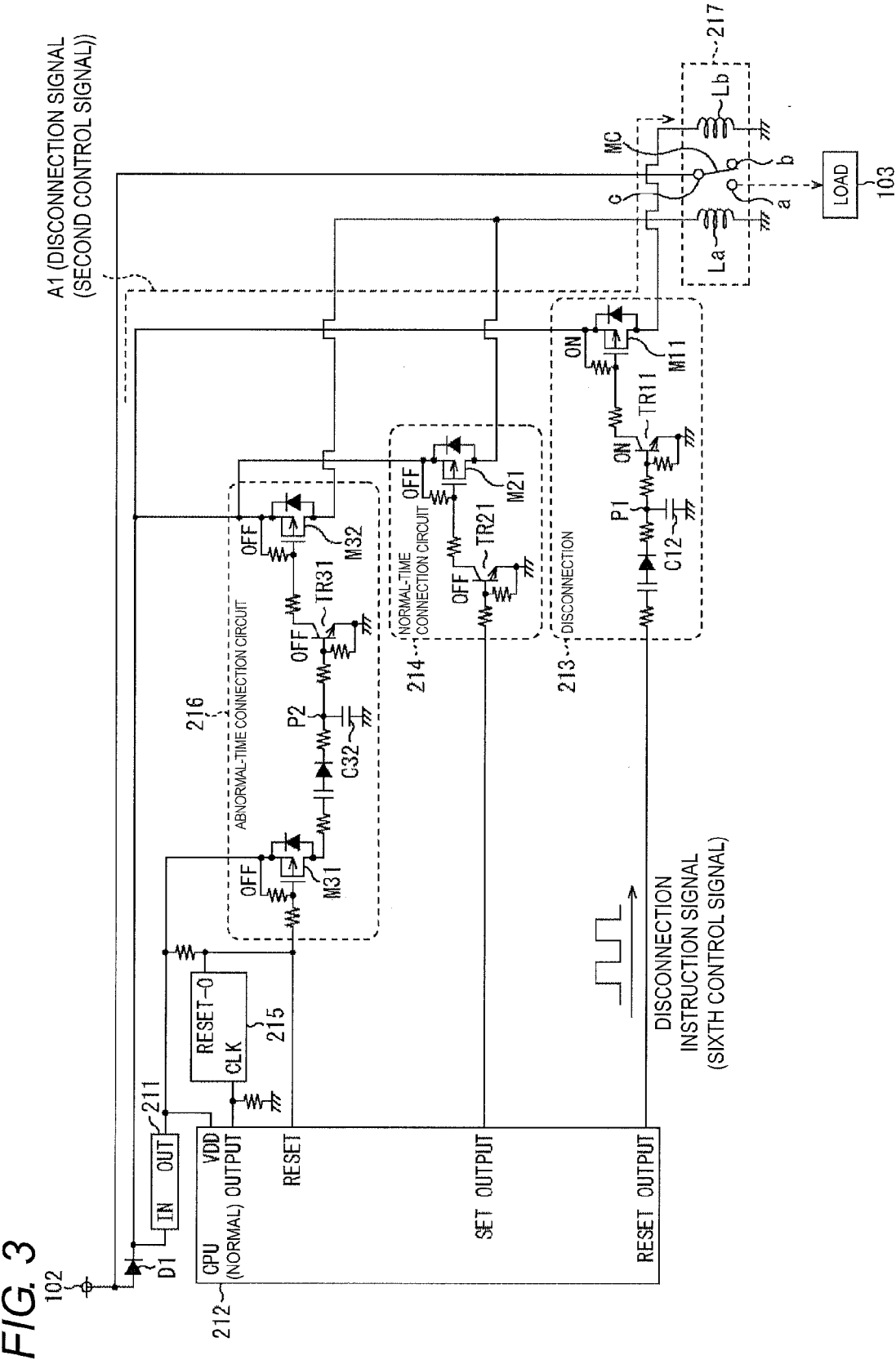
FIG. 3 is a view illustrating an operation of the power-supply management ECU when supply of an electric power to a load is stopped.
Figure 4:
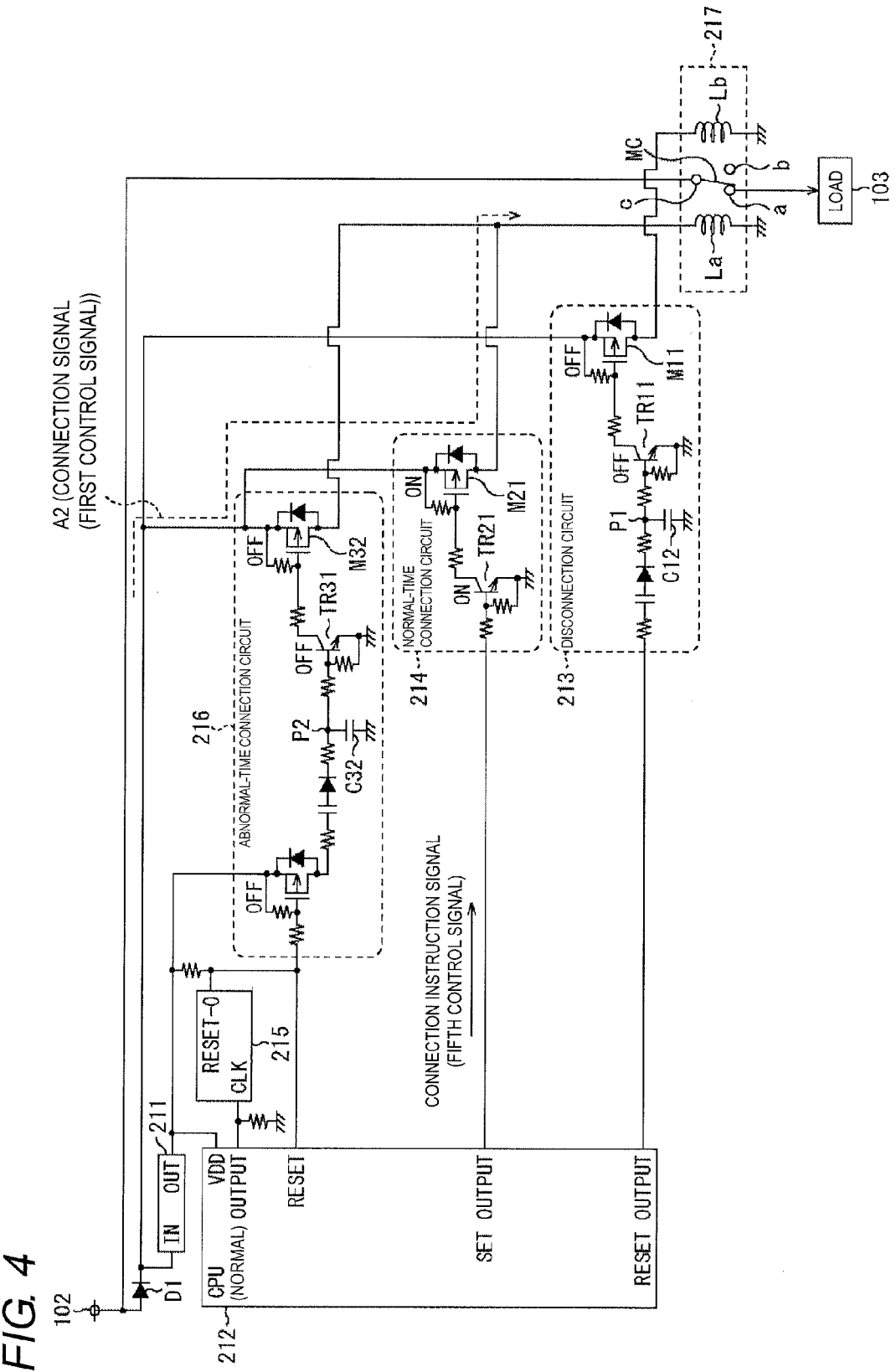
FIG. 4 is a view illustrating an operation of the power-supply management ECU when the supply of the electric power to the load is started.
Figure 5:
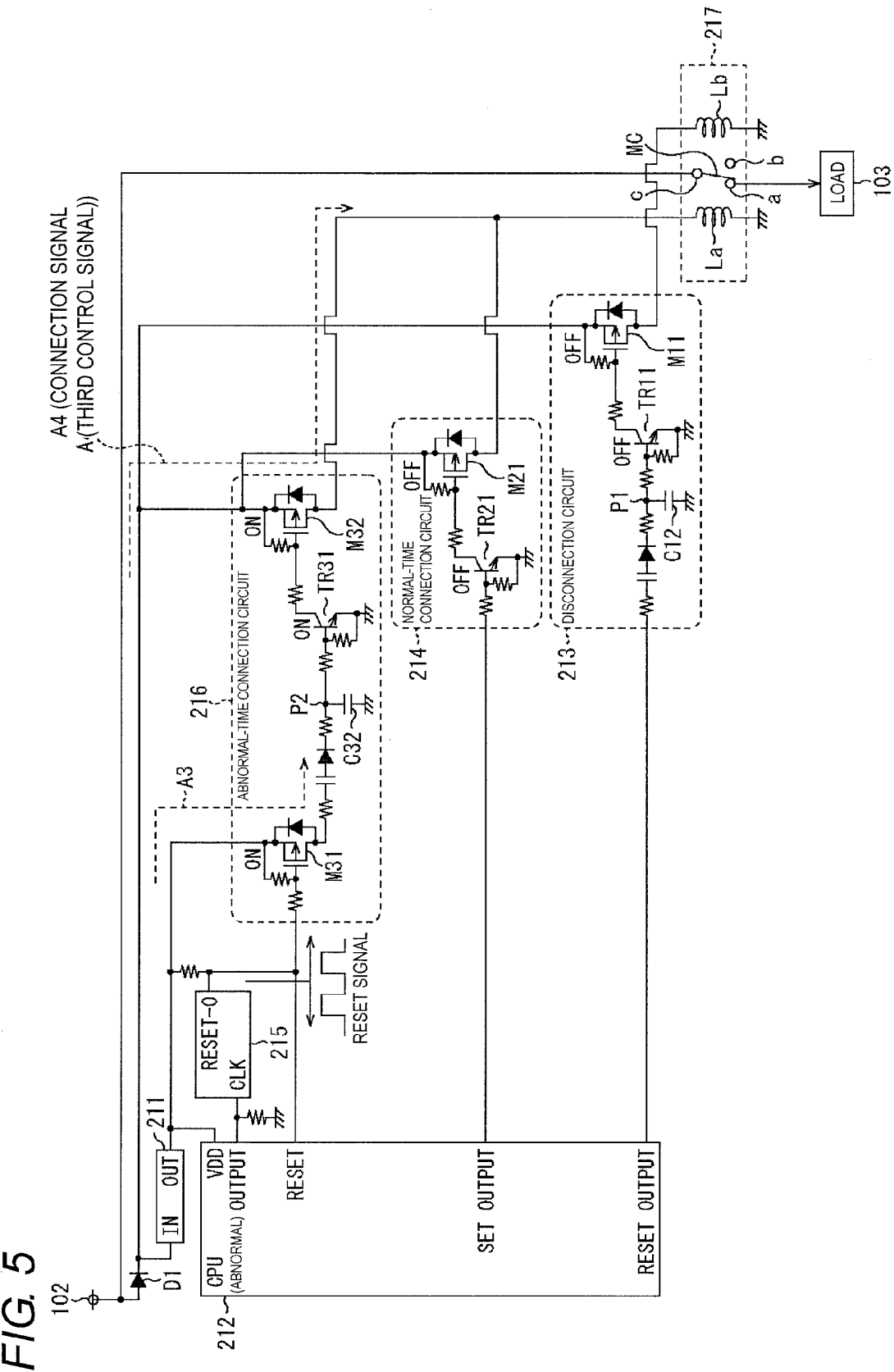
FIG. 5 is a view illustrating an operation of the power-supply management ECU when an abnormality is generated in a CPU.

An operation of the power-supply management ECU 201 will be described below with reference to FIGS. 3 to 5. In FIGS. 3 to 5, the signs are not partially illustrated for the sake of convenience.

(The Case that Supply of Electric Power to Load 103 is Stopped)

In the case that the electric power is supplied from the power supply 102 to the load 103 while the CPU 212 is normally operated, the operation to stop the supply of the electric power to the load 103 will be described with reference to FIG. 3.

In the case that the supply of the electric power to the load 103 is stopped, the pulsed disconnection instruction signal having a positive-true logic (high active) is continuously output from the reset output terminal of the CPU 212. Every time the pulsed disconnection instruction signal is transmitted to the disconnection circuit 213, a charge is accumulated in the capacitor C12, and a potential at a point P1 rises. The predetermined number of pulsed disconnection instruction signals is transmitted to the disconnection circuit 213, and a charge amount accumulated in the capacitor C12 increases. When the accumulated charge amount is greater than or equal to a predetermined amount while the potential at the point P1 is greater than or equal to a predetermined threshold, the transistor TR11 is turned on and therefore the MOSFET M11 is turned on.

When the MOSFET M11 is turned on, the excitation current is passed through the diode D1 and the MOSFET M11 from the power supply 102, and passed through the coil Lb of the keep relay 217 as indicated by an arrow A1. That is, the disconnection signal is output from the disconnection circuit 213, and transmitted to the coil Lb. When the disconnection signal is transmitted to the coil Lb for at least a predetermined time, the movable contact MC moves and comes into contact with the contact b. Therefore, the supply of the electric power from the power supply 102 to the load 103 is stopped.

The CPU 212 stops the output of the disconnection instruction signal after outputting the predetermined number of pulsed disconnection instruction signals. When the output of the disconnection instruction signal is stopped, the charge accumulated in the capacitor C12 is discharged, and the potential at the point P1 is gradually lowered. When the potential at the point P1 is less than the threshold, the transistor TR11 is turned off, and therefore the MOSFET M11 is turned off. Therefore, the transmission of the disconnection signal to the coil Lb is stopped.

The state in which the supply of the electric power to the load 103 is stopped is continued, because the movable contact MC of the keep relay 217 remains to be in contact with the contact b even after the supply of the disconnection signal is stopped.

(The Case that Supply of Electric Power to Load 103 is Started)

In the case that the supply of the electric power from the power supply 102 to the load 103 is stopped while the CPU 212 is normally operated, the operation to start the supply of the electric power to the load 103 will be described with reference to FIG. 4.

In the case that the supply of the electric power to the load 103 is started, the single pulsed connection instruction signal having the positive-true logic (high active) is output from the set output terminal of the CPU 212, and transmitted to the normal-time connection circuit 214. While the normal-time connection signal is transmitted, the transistor TR21 is turned on, and therefore the MOSFET M21 is turned on.

When the MOSFET M21 is turned on, the excitation current is passed through the diode D1 and the MOSFET M21 from the power supply 102, and passed through the coil La of the keep relay 217 as indicated by an arrow A2. That is, the connection signal is output from the normal-time connection circuit 214, and transmitted to the coil La. When the connection signal is transmitted to the coil La for at least a predetermined time, the movable contact MC moves and comes into contact with the contact a. Therefore, the supply of the electric power from the power supply 102 to the load 103 is started.

When the CPU 212 stops the output of the connection instruction signal, the transistor TR21 is turned off, and therefore the MOSFET M21 is also turned off. Therefore, the transmission of the connection signal to the coil La is stopped.

The supply of the electric power to the load 103 is continued, because the movable contact MC of the keep relay 217 remains to be in contact with the contact a even after the supply of the connection signal is stopped.

(In the Case that Abnormality is Generated in CPU 212)

The operation in the case that the abnormality is generated in the CPU 212 will be described below with reference to FIG. 5.

In the case that the CPU 212 is normally operated, the clear signal is periodically output from the output terminal to the monitor circuit 215 to reset the counter of the monitor circuit 215. The exceedance is not generated in the counter of the monitor circuit 215, and the reset signal is not output. Therefore, the MOSFET M31, the transistor TR31, and the MOSFET M32 of the abnormal-time connection circuit 216 are kept in the off state. Because the MOSFET M32 is turned off, the abnormal-time connection circuit 216 does not output the connection signal.

On the other hand, in the case that the abnormality is generated in the CPU 212, the output of the clear signal is stopped, but the counter of the monitor circuit 215 is not reset. When the exceedance is generated in the counter of the monitor circuit 215, the single pulsed reset signal having the negative-true logic (low active) is output from the reset output terminal of the monitor circuit 215, and transmitted to the reset terminal of the CPU 212 and the abnormal-time connection circuit 216.

When the reset signal is transmitted, the MOSFET M31 of the abnormal-time connection circuit 216 is turned on, and the current is passed from the power supply 102 to the capacitor C32 as indicated by an arrow A3. Therefore, the charge is accumulated in the capacitor C32, and the potential at a point P2 rises.

Then the monitor circuit 215 stops the output of the reset signal, resets the counter, and restarts the counting from the beginning. When the output of the reset signal is stopped, the MOSFET M31 is turned off to stop the supply of the current from the power supply 102 to the capacitor C32.

When receiving the reset signal, the CPU 212 is reset to the initial state by performing the restart. As a result, when the CPU 212 returns to the normal state, the CPU 212 restarts the output of the clear signal, but the monitor circuit 215 does not output the reset signal. The charge accumulated in the capacitor C32 is discharged, and the potential at the point P2 is lowered to the original state.

On the other hand, when the abnormality of the CPU 212 is not resolved, the monitor circuit 215 repeats the exceedance of the counter because the output of the clear signal from the CPU 212 remains to be stopped. Every time the exceedance is generated in the counter, the monitor circuit 215 outputs the single pulsed reset signal, the MOSFET M31 is turned on, and the current flows into the capacitor C32 from the power supply 102. Therefore, the charge amount accumulated in the capacitor C32 increases gradually. The operation is repeated predetermined times, and the potential at the point P2 becomes greater than or equal to a predetermined threshold. At this point, the transistor TR31 is turned on, and therefore the MOSFET M32 is turned on.

When the MOSFET M32 is turned on, the excitation current is passed through the diode D1 and the MOSFET M32 from the power supply 102, and passed through the coil La of the keep relay 217. That is, the connection signal is output from the abnormal-time connection circuit 216, and transmitted to the coil La. When the connection signal is transmitted to the coil La for at least a predetermined time, the movable contact MC moves and comes into contact with the contact a. Therefore, the supply of the electric power from the power supply 102 to the load 103 is started.

While the CPU 212 stops the output of the clear signal because the abnormality of the CPU 212 is not resolved, the monitor circuit 215 periodically transmits the reset signal to the abnormal-time connection circuit 216, thereby continuing the transmission of the connection signal to the coil La of the keep relay 217.

On the other hand, when the CPU 212 returns to the normal state, the CPU 212 restarts the output of the clear signal, but the monitor circuit 215 does not output the reset signal. Therefore, the charge accumulated in the capacitor C32 is discharged, and the potential at the point P2 is gradually lowered. When the potential at the point P2 is less than the threshold, the transistor TR31 is turned off, and therefore the MOSFET M32 is also turned off. Therefore, the transmission of the connection signal to the coil La of the keep relay 217 is stopped.

The supply of the electric power to the load 103 is continued, because the movable contact MC remains to be in contact with the contact a even after the supply of the connection signal is stopped.

Thus, the keep relay 217 can be set to the disconnection state as needed basis during the transportation of the vehicle or the long-period parking, and the dark current from the power supply 102 to the load 103 can be prevented.

On the other hand, in the case that the abnormality is generated in the CPU 212, the keep relay 217 is automatically set to and maintained in the connection state, so that the impossibility of the supply of the electric power to the load 103 can be prevented. Therefore, for example, the situation in which the vehicle running is adversely affected because the information stored in the memory of the ECU of the vehicle is erased or because loads, such as the lamp and the wiper, which are connected to the ECU, are not driven can be avoided.

Unless the predetermined number of pulsed disconnection instruction signals is transmitted to the disconnection circuit 213, the disconnection circuit 213 does not output the disconnection signal. Therefore, the false stop of the supply of the electric power to the load 103 due to a noise is prevented.

When the counter of the monitor circuit 215 exceeds the predetermined threshold, the predetermined number of pulsed reset signals is not transmitted to the abnormal-time connection circuit 216. Therefore, the false start of the supply of the electric power to the load 103 due to the noise is prevented, because the abnormal-time connection circuit 216 does not output the connection signal.

[Configuration Example of Power-Supply Management ECU 301]

Figure 6:
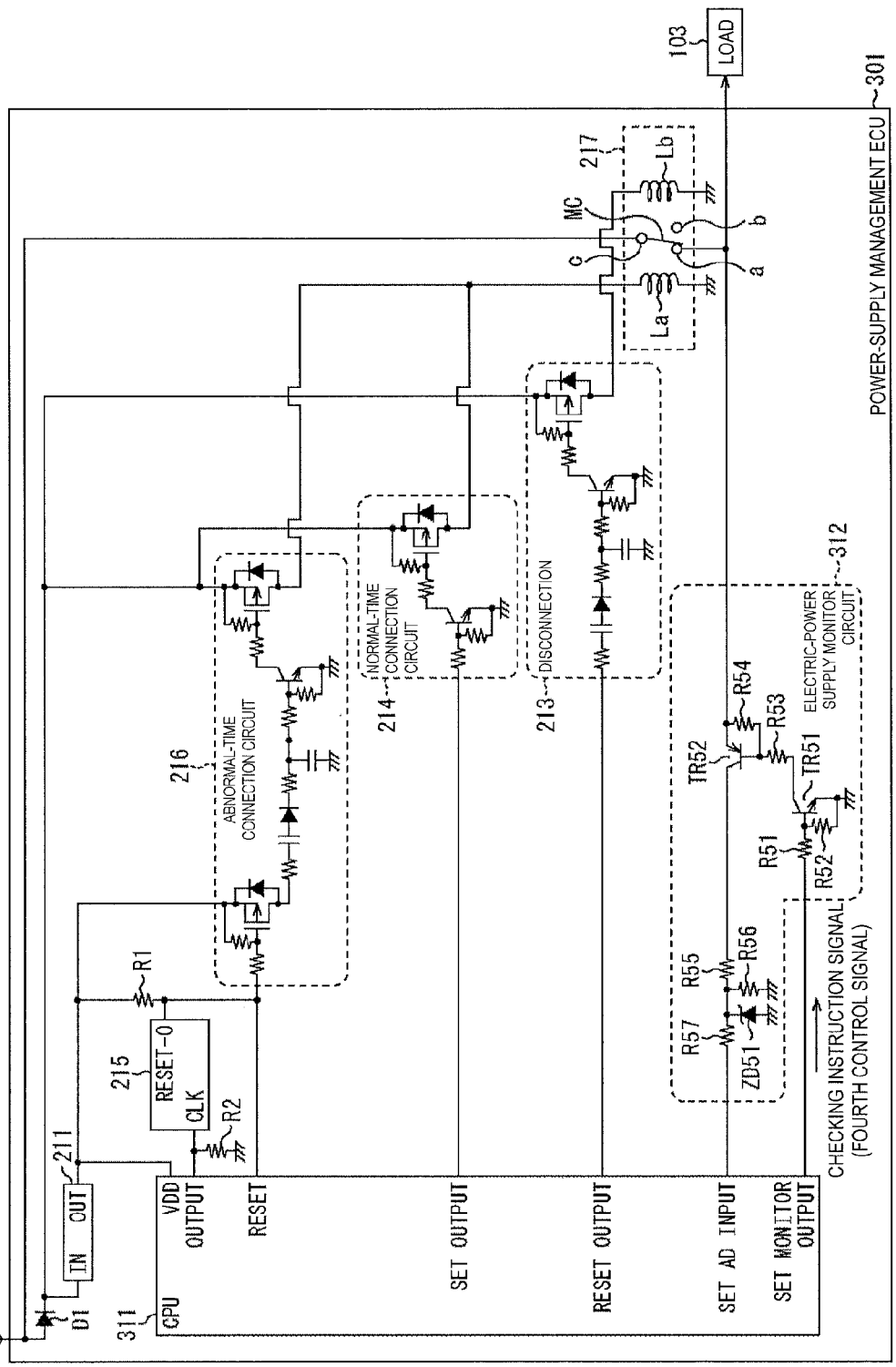
FIG. 6 is a circuit diagram illustrating a power-supply management ECU of a second specific example.

FIG. 6 is a circuit diagram illustrating a configuration example of a power-supply management ECU (Electronic Control Unit) 301 that is of a second specific example of the power-supply control device 101 in FIG. 1. In FIG. 6, the component corresponding to that in FIG. 2 is designated by the same sign (however, the signs are partially omitted for the sake of convenience), and the overlapping description of the portion having the same processing is omitted as appropriate.

The power-supply management ECU 301 differs from the power-supply management ECU 201 in FIG. 2 in that a CPU 311 is provided instead of the CPU 212 and that an electric-power supply monitor circuit 312 is added.

The CPU 311 differs from the CPU 212 in FIG. 2 in that a monitoring setting output terminal (SET MONITOR OUTPUT) and a monitoring input terminal (SET AD INPUT) are added.

The monitoring setting output terminal of the CPU 311 is connected to one end of a resistor R51 of the electric-power supply monitor circuit 312. In the case that the supply of the electric power to the load 103 is monitored, a checking instruction signal that is of a positive-true-logic (high-active) control signal is output from the monitoring setting output terminal, and transmitted to the electric-power supply monitor circuit 312.

The monitoring input terminal of the CPU 311 is connected to one end of a resistor R57 of the electric-power supply monitor circuit 312. An electric-power supply monitoring signal is input to the monitoring input terminal. The electric-power supply monitoring signal indicates the existence or non-existence of the electric power supplied from the power supply 102 to the load 103 through the keep relay 217.

The electric-power supply monitor circuit 312 includes resistors R51 to R57, an NPN-type transistor TR51, a PNP-type transistor TR52, and a Zener diode ZD51.

The base of the transistor TR51 is connected to the monitoring setting output terminal of the CPU 311 through the resistor R52, the collector is connected to the base of the transistor TR52 through the resistor R53, the emitter is connected to the ground, and the resistor R52 is connected between the base and the emitter. The collector of the transistor TR52 is connected to the monitoring input terminal of the CPU 311 through the resistors R55 and R57, the emitter is connected between the contact a of the keep relay 217 and the load 103, and the resistor R54 is connected between the base and the emitter. One end of the resistor R56 is connected between the resistors R55 and R57, the other end is connected to the ground.

The cathode of the Zener diode ZD51 is connected between the resistors R55 and R57, and the anode is connected to the ground.

[Operation of Power-Supply Management ECU 301]

An operation of the power-supply management ECU 301 will be described below. Only a portion in which the operation is different from that of the power-supply management ECU 201 is described, and overlapping description of a portion in which the operation is identical to that of the power-supply management ECU 201 is omitted as appropriate.

While the checking instruction signal is transmitted from the monitoring setting output terminal of the CPU 311 to the electric-power supply monitor circuit 312, the transistor TR51 is turned on, and therefore the transistor TR52 is turned on.

At this point, when the movable contact MC of the keep relay 217 is in contact with the contact a to supply the electric power from the power supply 102 to the load 103, the electric power (the current and the voltage) supplied from the keep relay 217 to the load 103 is partially supplied to the electric-power supply monitor circuit 312. The voltage is applied from the power supply 102 to the monitoring input terminal of the CPU 311 through the keep relay 217, the transistor TR52, the resistor R55, and the resistor R57, and the input voltage at the monitoring input terminal is set to a predetermined level (high level). In other words, the electric-power supply monitor circuit 312 transmits the high-level electric-power supply monitoring signal to the CPU 311.

On the other hand, when the movable contact MC of the keep relay 217 is in contact with the contact b and the electric power from the power supply 102 to the load 103 is not transmitted, the input voltage at the monitoring input terminal of the CPU 311 is set to a ground level (low level). In other words, the electric-power supply monitor circuit 312 transmits the low-level electric-power supply monitoring signal to the CPU 311.

Thus, while the checking instruction signal is transmitted to the electric-power supply monitor circuit 312, the electric-power supply monitor circuit 312 transmits the electric-power supply monitoring signal to the CPU 311.

On the other hand, when the checking instruction signal is not transmitted to the electric-power supply monitor circuit 312, the transistor TR51 and the transistor TR52 are turned off. Therefore, the input voltage at the monitoring input terminal of the CPU 311 remains to be the ground level irrespective of the existence or non-existence of the supply of the electric power to the load 103. In other words, the electric-power supply monitor circuit 312 does not transmit the electric-power supply monitoring signal to the CPU 311.

Thus, the existence or non-existence of the supply of the electric power to the load 103 can be monitored only while the CPU 311 transmits the checking instruction signal to the electric-power supply monitor circuit 312. Accordingly, the existence or non-existence of the supply of the electric power to the load 103 can be monitored only when needed.

[Configuration Example of Power-Supply Management ECU 401]

Figure 7:
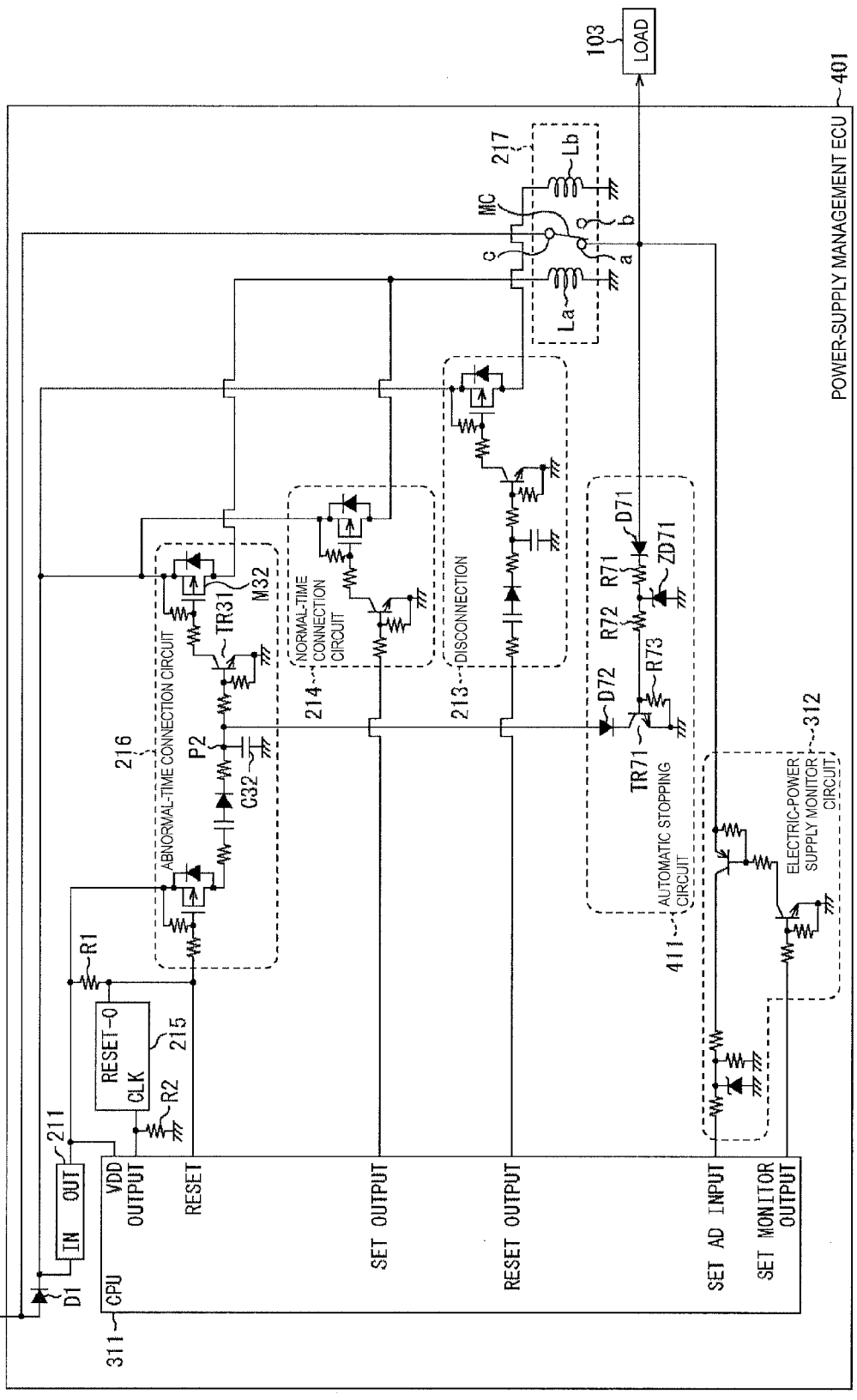
FIG. 7 is a circuit diagram illustrating a power-supply management ECU of a third specific example.

FIG. 7 is a circuit diagram illustrating a configuration example of a power-supply management ECU (Electronic Control Unit) 401 that is of a third specific example of the power-supply control device 101 in FIG. 1. In FIG. 7, the component corresponding to that in FIG. 2 or 6 is designated by the same sign (however, the signs are partially omitted for the sake of convenience), and the overlapping description of the portion having the same processing is omitted as appropriate.

The power-supply management ECU 401 differs from the power-supply management ECU 301 in FIG. 3 in that an automatic stopping circuit 411 is added.

The automatic stopping circuit 411 includes diodes D71 and D72, resistors R71 to R73, a Zener diode ZD71, and an NPN-type transistor TR71.

The anode of the diode D71 is connected between the contact a of the keep relay 217 and the load 103. The resistors R71 and R72 are connected in series between the cathode of the diode D71 and the base of the transistor TR71. The cathode of the Zener diode ZD71 is connected between the resistors R71 and R72, and the anode is connected to the ground. The collector of the transistor TR71 is connected to the cathode of the diode D72, the emitter is connected to the ground, and the resistor R73 is connected between the base and the emitter. The anode of the diode D72 is connected to the point P2 of the abnormal-time connection circuit 216.

[Operation of Power-Supply Management ECU 401]

An operation of the power-supply management ECU 401 will be described below. Only the portion in which the operation is different from that of the power-supply management ECUs 201 and 301 is described, and overlapping description of a portion in which the operation is identical to that of the power-supply management ECUs 201 and 301 is omitted as appropriate.

As described above, in the case that the abnormality is generated in the CPU 311, the charge is accumulated in the capacitor C32 of the abnormal-time connection circuit 216 by the reset signal transmitted from the monitor circuit 215. When the potential at the point P2 exceeds the predetermined threshold, the transistor TR31 and the MOSFET M32 are turned on, the connection signal is transmitted to the coil La of the keep relay 217, and the movable contact MC of the keep relay 217 comes into contact with the contact a to start the supply of the electric power to the load 103.

At this point, the electric power (the voltage and the current) supplied from the keep relay 217 to the load 103 is partially supplied to the automatic stopping circuit 411. The current is passed through the keep relay 217, the diode D71, and the resistors R71 and R72 from the power supply 102, and the current is passed through the base of the transistor TR71 to turn on the transistor TR71. In other words, the supply of the electric power to the load 103 is detected by the transistor TR71.

When the transistor TR71 is turned on, the charge accumulated in the capacitor C32 of the abnormal-time connection circuit 216 flows to the ground through the diode D72 and the transistor TR71, and the potential at the point P2 is lowered. When the potential at the point P2 is less than the predetermined threshold, the transistor TR31 is turned off, and therefore the MOSFET M32 is turned off, thereby stopping the transmission of the connection signal to the coil La.

The supply of the electric power to the load 103 is continued, because the movable contact MC remains to be in contact with the contact a even after the supply of the connection signal is stopped. The connection signal is not transmitted to the coil La of the keep relay 217, because the transistor TR71 of the automatic stopping circuit 511 remains to be on while the supply of the electric power to the load 103 is continued.

When the abnormality is generated in the CPU 311, the abnormal-time connection circuit 216 transmits the connection signal to the coil La of the keep relay 217, and the movable contact MC comes into contact with the contact a, thereby instantaneously stopping the transmission of the connection signal to the coil La. Therefore, power consumption of the keep relay 217 can be suppressed, and a time for which the power supply 102 supplies the electric power can be lengthened.

[Configuration Example of Power-Supply Management ECU 501]

Figure 8:
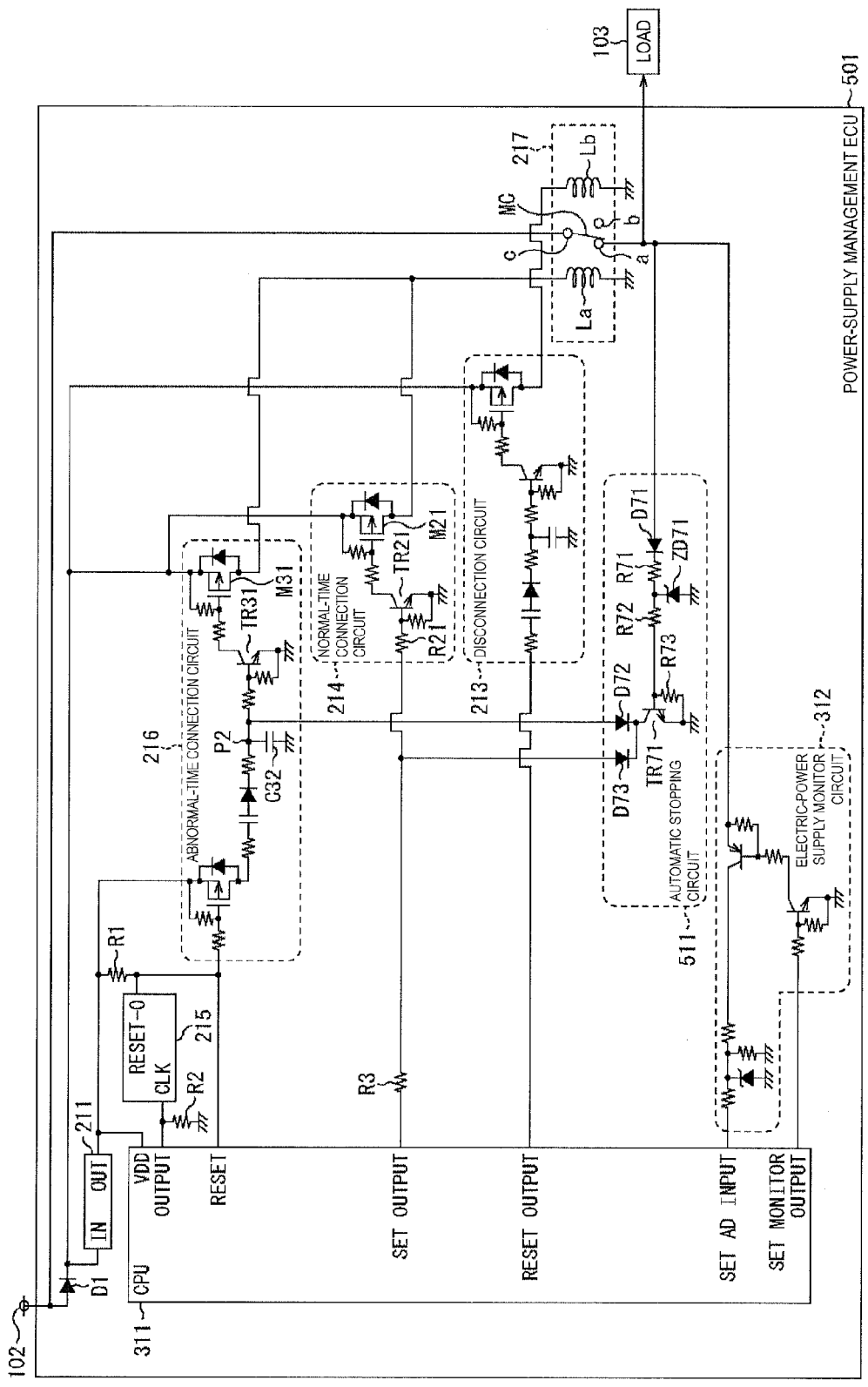
FIG. 8 is a circuit diagram illustrating a power-supply management ECU of a fourth specific example.

FIG. 8 is a circuit diagram illustrating a configuration example of a power-supply management ECU (Electronic Control Unit) 501 that is of a fourth specific example of the power-supply control device 101 in FIG. 1. In FIG. 8, the component corresponding to that in FIG. 2, 6, or 7 is designated by the same sign (however, the signs are partially omitted for the sake of convenience), and the overlapping description of the portion having the same processing is omitted as appropriate.

The power-supply management ECU 501 differs from the power-supply management ECU 401 in FIG. 7 in that an automatic stopping circuit 511 is provided instead of the automatic stopping circuit 411 and that a resistor R3 is added.

The automatic stopping circuit 511 differs from the automatic stopping circuit 411 in FIG. 8 in that a diode D73 is added.

One end of the resistor R3 is connected to the set output terminal of the CPU 311, the other end is connected to the anode of the diode D73 and one end of the resistor R21 of the normal-time connection circuit 214. The cathode of the diode D73 is connected to the collector of the transistor TR71.

[Operation of Power-Supply Management ECU 501]

An operation of the power-supply management ECU 501 will be described below. Only the portion in which the operation is different from that of the power-supply management ECUs 201, 301, and 401 is described, and overlapping description of a portion in which the operation is identical to that of the power-supply management ECUs 201, 301, and 401 is omitted as appropriate.

As described above, when (the current of) the connection instruction signal is output from the set output terminal of the CPU 311, the transistor TR21 and the MOSFET M21 of the normal-time connection circuit 214 are turned on to transmit the connection signal to the coil La of the keep relay 217, and the movable contact MC comes into contact with the contact a to start the supply of the electric power to the load 103.

At this point, the electric power (the voltage and the current) supplied from the keep relay 217 to the load 103 is partially supplied to the automatic stopping circuit 511. The current is passed through the keep relay 217, the diode D71, and the resistors R71 and R72 from the power supply 102, and the current is passed through the base of the transistor TR71 to turn on the transistor TR71. In other words, the supply of the electric power to the load 103 is detected by the transistor TR71.

When the transistor TR71 is turned on, the wiring between the set output terminal of the CPU 311 and the normal-time connection circuit 214 is connected to the ground through the diode D73 and the transistor TR71. As a result, the connection instruction signal output from the set output terminal of the CPU 311 is conducted to the automatic stopping circuit 511 before input to the normal-time connection circuit 214, and the connection instruction signal flows to the ground through the diode D73 and the transistor TR71. Therefore, the transmission of the connection instruction signal to the normal-time connection circuit 214 is stopped, the transistor TR21 is turned off, and the MOSFET M21 is turned off, thereby stopping the transmission of the connection signal to the coil La.

The supply of the electric power to the load 103 is continued, because the movable contact MC remains to be in contact with the contact a even after the supply of the connection signal is stopped. The connection signal is not transmitted to the coil La of the keep relay 217, even if the connection instruction signal is output while the supply of the electric power to the load 103 is continued.

Thus, the CPU 311 outputs the connection instruction signal, the normal-time connection circuit 214 transmits the connection signal to the coil La of the keep relay 217, and the movable contact MC comes into contact with the contact a, thereby instantaneously stopping the transmission of the connection signal to the coil La. At this point, because a resistance component of the coil La is smaller than a resistance component of a circuit constructed by the diode D73 and the transistor TR71, the consumed power of the case that the connection signal is transmitted to the coil La is smaller than the consumed power of the case that the connection instruction signal flows to the ground through the diode D73 and the transistor TR71. As a result, the power consumption can be suppressed in the whole of the power-supply management ECU 501. As a result, the time for which the power supply 102 supplies the electric power can be lengthened. Particularly, for example, the power consumption can effectively be reduced in the case that an output time of the connection instruction signal of the CPU 311 is lengthened or in the case that the output of the connection instruction signal is not stopped due to breakdown of the CPU 311.

2. Second Embodiment

A second embodiment of the present invention will be described below with reference to FIGS. 9 and 10.

[Configuration Example of Power-Supply Control Device 601]

Figure 9:
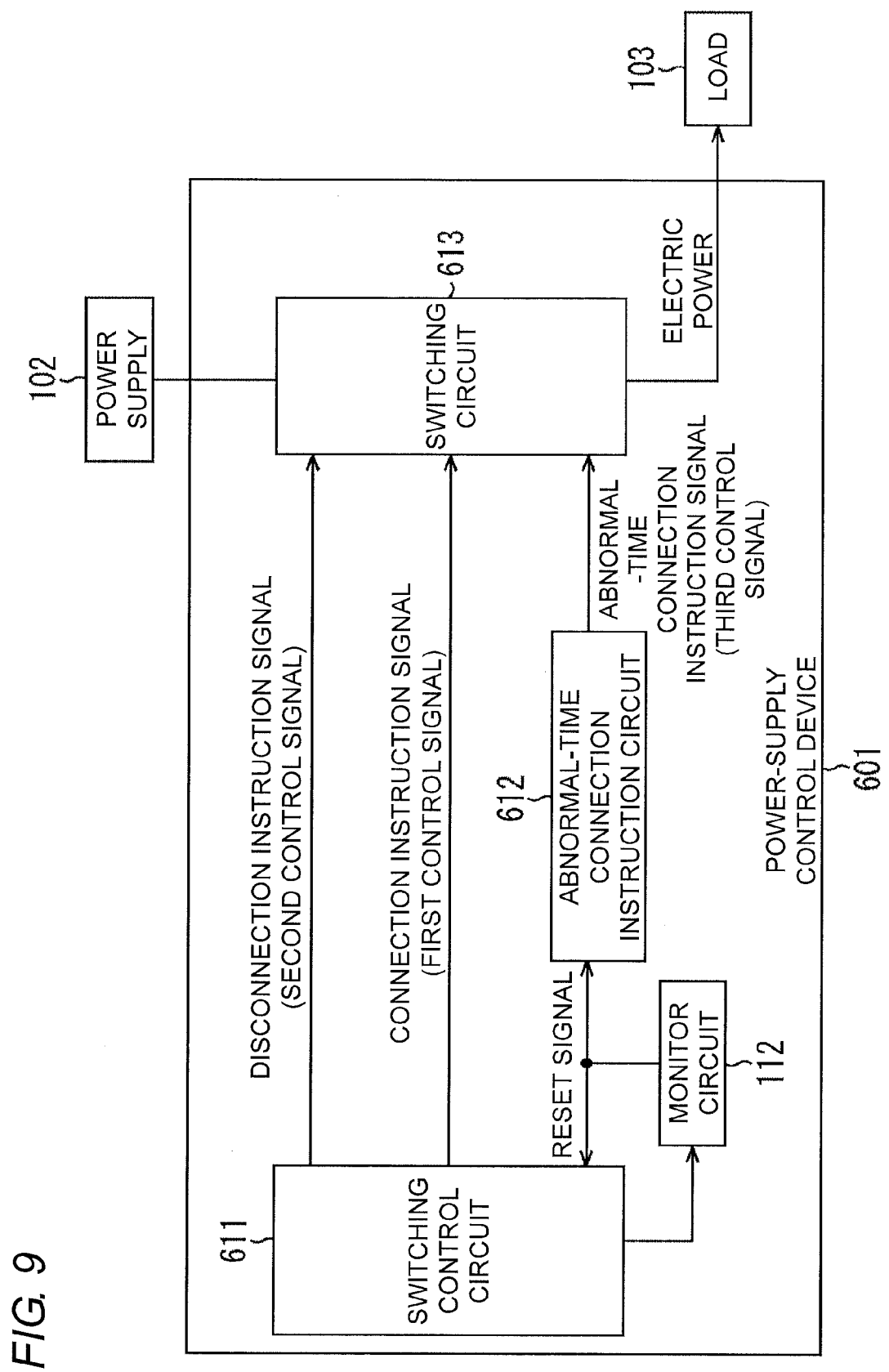
FIG. 9 is a block diagram illustrating a power-supply control device according to a second embodiment of the present invention.

FIG. 9 is a block diagram illustrating a power-supply control device 601 that is of a basic configuration example of the second embodiment of the present invention. In FIG. 9, the component corresponding to that in FIG. 1 is designated by the same sign, and the overlapping description of the portion having the same processing is omitted as appropriate.

For example, like the power-supply control device 101 in FIG. 1, the power-supply control device 601 is provided in the vehicle, and supplies the electric power from the power supply 102 to the load 103 of the vehicle.

The power-supply control device 601 includes the monitor circuit 112, a switching control circuit 611, an abnormal-time connection instruction circuit 612, and a switching circuit 613.

The switching control circuit 611 controls the supply of the electric power from the power supply 102 to the load 103 by controlling the switching circuit 613. Specifically, in the case that the supply of the electric power from the power supply 102 to the load 103 is stopped, the switching control circuit 611 transmits a control signal (hereinafter referred to as a disconnection instruction signal) to the switching circuit 613 to electrically disconnect the power supply 102 from the load 103. In the case that the supply of the electric power from the power supply 102 to the load 103 is started, the switching control circuit 611 transmits a control signal (hereinafter referred to as a connection instruction signal) to the switching circuit 613 in order to electrically connect the power supply 102 to the load 103.

In the case that the abnormality is generated in the switching control circuit 611 to transmit the reset signal from the monitor circuit 112, the abnormal-time connection instruction circuit 612 transmits a control signal (hereinafter referred to as an abnormal-time connection instruction signal) to the switching circuit 613 in order to electrically connect the power supply 102 to the load 103.

The switching circuit 613 can switch between the connection state in which the power supply 102 is electrically connected to the load 103 and the disconnection state in which the power supply 102 is electrically disconnected from the load. Specifically, when receiving the disconnection instruction signal from the switching control circuit 611, the switching circuit 613 becomes the disconnection state, and maintains the disconnection state even after the transmission of the disconnection instruction signal is stopped. When receiving the connection instruction signal from the switching control circuit 611, or when receiving the abnormal-time connection instruction signal from the abnormal-time connection instruction circuit 612, the switching circuit 613 becomes the connection state, and maintains the connection state even after the supply of the connection instruction signal or the abnormal-time connection instruction signal is stopped.

[Configuration Example of Power-Supply Management ECU 701]

Figure 10:
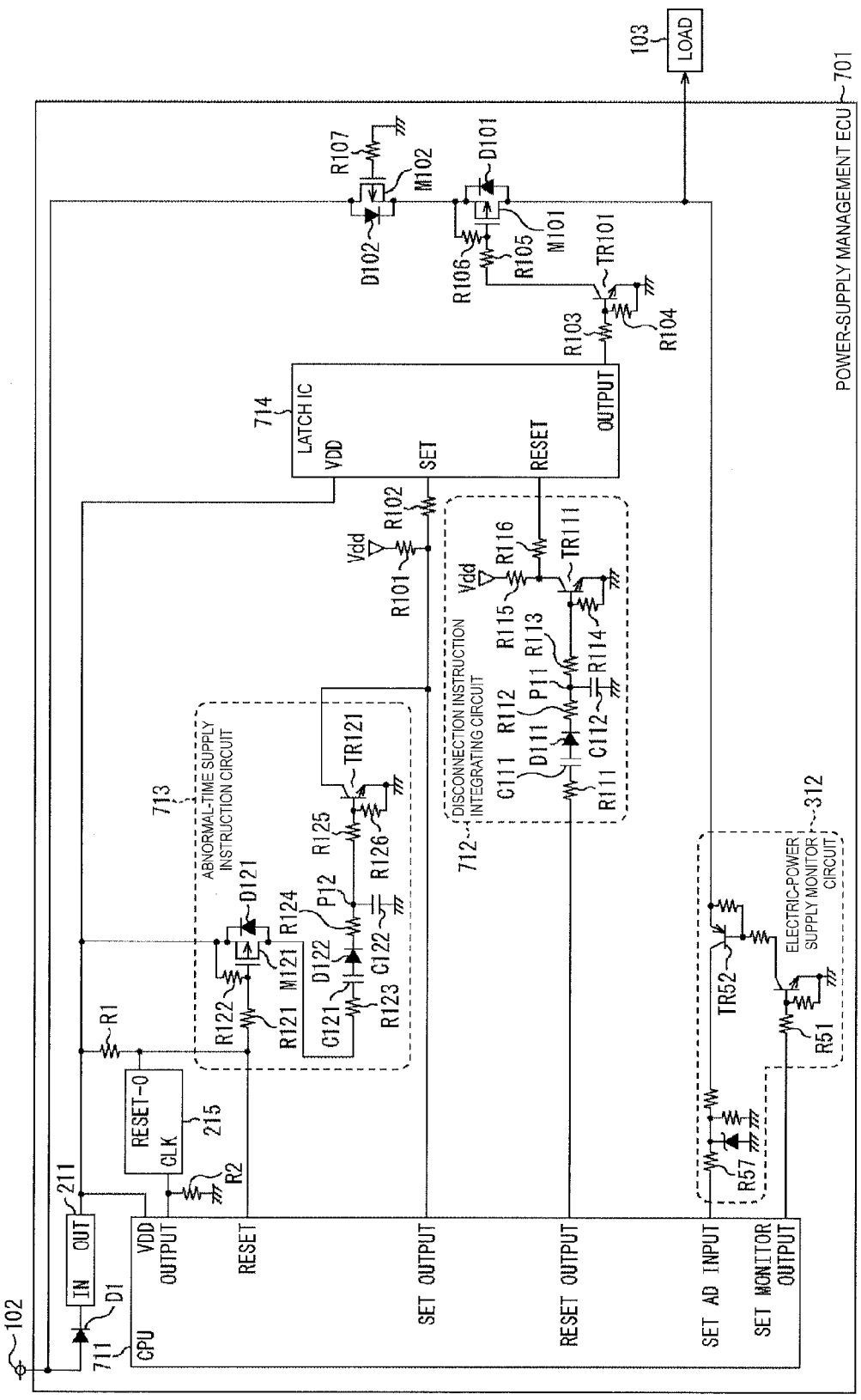
FIG. 10 is a circuit diagram illustrating a power-supply management ECU of a fifth specific example.

FIG. 10 is a circuit diagram illustrating a configuration example of a power-supply management ECU (Electronic Control Unit) 701 that is of a specific example of the power-supply control device 601 in FIG. 9. In FIG. 10, the component corresponding to that in FIGS. 2 and 5 to 8 is designated by the same sign, and the overlapping description of the portion having the same processing is omitted as appropriate.

The power-supply management ECU 701 includes the voltage regulator 211, the monitor circuit 215, the electric-power supply monitor circuit 312, a CPU (Central Processing Unit) 711, a disconnection instruction integrating circuit 712, an abnormal-time connection instruction circuit 713, a latch IC 714, diodes D1, D101, and D102, resistors R1, R2, and R101 to R107, an NPN-type transistor TR101, and P-type MOSFETs M101 and M102.

The power supply 102 is connected to the anode of the diode D1, the anode of the diode D102, and the drain of the MOSFET M102. The cathode of the diode D1 is connected to the input terminal (IN) of the voltage regulator 211.

The output terminal (OUT) of the voltage regulator 211 is connected to a power supply terminal (VDD) of the CPU 711, one end of the resistor R1, a source of the MOSFET M121 of the abnormal-time connection instruction circuit 713, and a power supply terminal (VDD) of the latch IC 714. The voltage regulator 211 converts the voltage (for example, DC12 V) of the electric power supplied from the power supply 102 into a predetermined voltage (for example, DC5 V), and supplies the converted voltage to the CPU 711 and the abnormal-time connection instruction circuit 713, and the latch IC 714.

A reset output terminal (RESET OUTPUT) of the CPU 711 is connected to one end of the resistor R111 of the disconnection instruction integrating circuit 712. In the case that the supply of the electric power from the power supply 102 to the load 103 is stopped, the pulsed disconnection instruction signal is continuously output from the reset output terminal of the CPU 711, and transmitted to the disconnection instruction integrating circuit 712.

A set output terminal (SET OUTPUT) of the CPU 711 is connected to a power supply Vdd having a predetermined voltage through the resistor R101, and connected to a set terminal (SET) of the latch IC 714 through the resistor R102. In the case that the supply of the electric power from the power supply 102 to the load 103 is started, the connection instruction signal is output from the set output terminal, and transmitted to the latch IC 714.

Specifically, the set output terminal of the CPU 711 is usually set to a high impedance, a predetermined high-level voltage is input from the power supply Vdd to the set terminal of the latch IC 714 through the resistors R101 and R102. On the other hand, in the case that the supply of the electric power from the power supply 102 to the load 103 is started, the set output terminal is set to a low impedance for a predetermined time, and the input voltage at the set terminal of the latch IC 714 becomes the low level (the ground level). Thus, the negative-true-logic (low active) connection instruction signal is input to the set terminal of the latch IC 714.

An output terminal (OUTPUT) of the CPU 711 is connected to the clock terminal (CLK) of the monitor circuit 215. One end of the resistor R2 is connected between the output terminal of the CPU 711 and the clock terminal of the monitor circuit 215, and the other end is connected to the ground. In the case that the CPU 711 is normally operated, the single pulsed clear signal is periodically output from the output terminal of the CPU 711, and transmitted to the monitor circuit 215. On the other hand, the output of the clear signal is stopped in the case that the abnormality is generated in the CPU 711.

A reset terminal (RESET) of the CPU 711 is connected to the reset output terminal (RESET-O) of the monitor circuit 215, one end of the resistor R1, which is opposite to the end connected to the voltage regulator 211, and one end of a resistor R121 of the abnormal-time connection instruction circuit 713. When the reset signal is input to the reset terminal from the monitor circuit 215, the CPU 711 is reset to the initial state by performing the restart.

A monitoring setting output terminal (SET MONITOR OUTPUT) of the CPU 711 is connected to one end of the resistor R51 of the electric-power supply monitor circuit 312. In the case that the supply of the electric power to the load 103 is monitored, the positive-true-logic (high-active) checking instruction signal is output from the monitoring setting output terminal, and transmitted to the electric-power supply monitor circuit 312.

A monitoring input terminal (SET AD INPUT) of the CPU 711 is connected to one end of a resistor R57 of the electric-power supply monitor circuit 312. The electric-power supply monitoring signal is input to the monitoring input terminal. The electric-power supply monitoring signal indicates the existence or non-existence of the electric power supplied from the power supply 102 to the load 103.

The disconnection instruction integrating circuit 712 includes resistors R111 to R116, capacitors C111 and C112, a diode D111, and an NPN-type transistor TR111.

The resistor R111 and the capacitor C111 are connected in series between the reset output terminal of the CPU 711 and the anode of the diode D111. The resistors R112 and R113 are connected in series between the cathode of the diode D111 and a base of the transistor TR111. One end of the capacitor C112 is connected between the resistors R112 and R113, and the other end is connected to the ground. The collector of the transistor TR111 is connected to the power supply Vdd through the resistor R115, and connected to the reset terminal (RESET) of the latch IC 714 through the resistor R116, the emitter is connected to the ground, and the resistor R114 is connected between the base and the emitter.

An operation of the disconnection instruction integrating circuit 712 is described later.

The abnormal-time connection instruction circuit 713 includes resistors R121 to R126, diodes D121 and D122, capacitors C121 and C122, a P-type MOSFET M121, and an NPN-type transistor TR121.

The gate of the MOSFET M121 is connected to the reset terminal of the CPU 711 through the resistor R121, the source is connected to the cathode of the diode D121, and the resistor R122 is connected between the gate and the source. The resistor R123 and the capacitor C121 are connected in series between the drain of the MOSFET M121 and the anode of the diode D122. The resistors R124 and R125 are connected in series between the cathode of the diode D122 and the base of the transistor TR121. One end of the capacitor C122 is connected between the resistors R124 and R125, and the other end is connected to the ground. The collector of the transistor TR121 is connected to the set output terminal of the CPU 711, the emitter is connected to the ground, and the resistor R126 is connected between the base and the emitter.

An operation of the abnormal-time connection instruction circuit 713 is described later.

An output terminal (OUTPUT) of the latch IC 714 is connected to the base of the transistor TR101 through the resistor R103.

The CPU 711 transmits the negative-true-logic (low-active) connection instruction signal to the set terminal of the latch IC 714, and the abnormal-time connection instruction circuit 713 transmits the negative-true-logic (low-active) abnormal-time connection instruction signal to the set terminal of the latch IC 714. When receiving the connection instruction signal or the abnormal-time connection instruction signal, the latch IC 714 starts the output of a control signal (hereinafter referred to as an electric-power supply signal) from the output terminal thereof in order to supply the electric power to the load 103, and the latch IC 714 continues the output of the electric-power supply signal even after the transmission of the connection instruction signal or the abnormal-time connection instruction signal is stopped.

The disconnection instruction integrating circuit 712 transmits the negative-true-logic (low-active) disconnection instruction signal to the reset terminal of the latch IC 714. When receiving the disconnection instruction signal, the latch IC 714 stops the output of the electric-power supply signal from the output terminal thereof, and the latch IC 714 continues the state in which the output of the electric-power supply signal is stopped even after the transmission of the disconnection instruction signal is stopped.

The collector of the transistor TR101 is connected to the gate of the MOSFET M101 through the resistor R105, the emitter is connected to the ground, and the resistor R104 is connected between the base and the emitter. The drain of the MOFET M101 is connected to the anode of the diode D101, the emitter of the transistor TR52 of the electric-power supply monitor circuit 312, and the load 103. The source of the MOFET M101 is connected to the source of the MOSFET M102 and the cathode of the diode D102, and the resistor R106 is connected between the gate and the source.

The circuit including the latch IC 714, the transistor TR101, and the MOSFET M101 constitutes the circuit equivalent to the switching circuit 613 in FIG. 9.

The gate of the MOSFET M102 is connected to the ground through the resistor R107. The MOSFET M102 and the diode D102 are provided in order to prevent a back-flow of the current from the load 103 to the power supply 102.

[Operation of Power-Supply Management ECU 701]

An operation of the power-supply management ECU 701 will be described below.

(The Case that Supply of Electric Power to Load 103 is Stopped)

In the case that the electric power is supplied from the power supply 102 to the load 103 while the CPU 212 is normally operated, the operation to stop the supply of the electric power to the load 103 will be described.

In the case that the supply of the electric power to the load 103 is stopped, the pulsed disconnection instruction signal having the positive-true logic (high active) is continuously output from the reset output terminal of the CPU 711, the charge is accumulated in the capacitor C112 every time the pulsed disconnection instruction signal is transmitted to the disconnection instruction integrating circuit 712, and the potential at a point P11 rises. The transistor TR111 is turned on when the charge amount accumulated in the capacitor C112 is greater than or equal to a predetermined amount while the potential at the point P11 is greater than or equal to a predetermined threshold. Therefore, the input voltage at the reset terminal of the latch IC 714 becomes the low level (ground level). That is, the disconnection instruction signal is input from the disconnection instruction integrating circuit 712 to the reset terminal of the latch IC 714. Therefore, the latch IC 714 stops the output of the electric-power supply signal.

When the latch IC 714 stops the output of the electric-power supply signal, the transistor TR101 is turned off, and therefore the MOFET M101 is turned off. Therefore, the power supply 102 is electrically disconnected from the load 103 to stop the supply of the electric power from the power supply 102 to the load 103.

The CPU 711 stops the output of the disconnection instruction signal after outputting the predetermined number of pulsed disconnection instruction signals. When the output of the disconnection instruction signal is stopped, the charge accumulated in the capacitor C112 is discharged, and the potential at the point P11 is gradually lowered. When the potential at the point P11 is less than a predetermined threshold, the transistor TR111 is turned off. Therefore, the input voltage at the reset terminal of the latch IC 714 becomes the high level. That is, the disconnection instruction integrating circuit 712 stops the transmission of the disconnection instruction signal.

Because the latch IC 714 maintains the state in which the output of the electric-power supply signal is stopped even after the transmission of the disconnection instruction signal is stopped, the state in which the supply of the electric power to the load 103 is stopped is continued.

(The Case that Supply of Electric Power to Load 103 is Started)

In the case that the supply of the electric power from the power supply 102 to the load 103 is stopped while the CPU 711 is normally operated, the operation to start the supply of the electric power to the load 103 will be described.

In the case that the supply of the electric power to the load 103 is started, the set output terminal of the CPU 711 is set to the low impedance. Therefore, the input voltage at the set terminal of the latch IC 714 becomes the low level (ground level). That is, the connection instruction signal is input from the set output terminal of the CPU 711. Therefore, the latch IC 714 starts the output of the electric-power supply signal.

When the latch IC 714 starts the output of the electric-power supply signal, the transistor TR101 is turned on, and therefore the MOFET M101 is turned on. Therefore, the power supply 102 is electrically connected to the load 103 to start the supply of the electric power from the power supply 102 to the load 103 through the MOSFETs M102 and M101.

Then the CPU 711 sets the set output terminal to the high impedance. Therefore, the input voltage at the set terminal of the latch IC 714 becomes the high level. That is, the CPU 711 stops the transmission of the connection instruction signal.

Because the latch IC 714 maintains the state in which the electric-power supply signal is output even after the transmission of the connection instruction signal is stopped, the state in which the supply of the electric power to the load 103 is continued.

(In the Case that Abnormality is Generated in CPU 711)

The operation in the case that the abnormality is generated in the CPU 711 will be described below.

In the case that the CPU 711 is normally operated, the clear signal is periodically output to the monitor circuit 215 from the output terminal to reset the counter of the monitor circuit 215. The exceedance is not generated in the counter of the monitor circuit 215, and the reset signal is not output. Therefore, the MOSFET M121 and the transistor TR121 of the abnormal-time connection instruction circuit 713 are kept in the off state. Because the transistor TR121 is turned off, the input voltage at the set terminal of the latch IC 714 becomes the high level. That is, the abnormal-time connection instruction signal is not input.

On the other hand, in the case that the abnormality is generated in the CPU 711, the output of the clear signal is stopped, but the counter of the monitor circuit 215 is not reset. When the exceedance is generated in the counter of the monitor circuit 215, the single pulsed reset signal having the negative-true logic (low active) is output from the reset output terminal of the monitor circuit 215, and transmitted to the reset terminal of the CPU 711 and the abnormal-time connection instruction circuit 713.

While the reset signal is transmitted, the MOSFET M121 of the abnormal-time connection instruction circuit 713 is turned on, and the current flows into the capacitor C122 from the power supply 102. Therefore, the charge is accumulated in the capacitor C122, and the potential at a point P12 rises.

Then the monitor circuit 215 stops the output of the reset signal, resets the counter, and restarts the counting from the beginning. When the output of the reset signal is stopped, the MOSFET M121 is turned off to stop the supply of the current from the power supply 102 to the capacitor C122.

When receiving the reset signal, the CPU 711 is reset to the initial state by performing the restart. As a result, when the CPU 711 returns to the normal state, the CPU 711 restarts the output of the clear signal, but the monitor circuit 215 does not output the reset signal. The charge accumulated in the capacitor C122 is discharged, and the potential at the point P12 is lowered to the original state.

On the other hand, when the abnormality of the CPU 711 is not resolved, the monitor circuit 215 repeats the exceedance of the counter because the output of the clear signal from the CPU 711 remains to be stopped. Every time the exceedance is generated in the counter, the monitor circuit 215 outputs the single pulsed reset signal, the MOSFET M121 is turned on, and the current flows into the capacitor C122 from the power supply 102. Therefore, the charge amount accumulated in the capacitor C122 increases gradually. The operation is repeated predetermined times, and the potential at the point P12 becomes greater than or equal to a predetermined threshold. At this point, the transistor TR121 is turned on. Therefore, the input voltage at the set terminal of the latch IC 714 becomes the low level. That is, the abnormal-time connection instruction circuit 713 outputs the abnormal-time connection instruction signal to the set terminal of the latch IC 714. Therefore, the latch IC 714 starts the output of the electric-power supply signal.

When the latch IC 714 starts the output of the electric-power supply signal, the transistor TR101 is turned on, and therefore the MOFET M101 is turned on. Therefore, the power supply 102 is electrically connected to the load 103 to start the supply of the electric power from the power supply 102 to the load 103 through the MOSFETs M102 and M101.

Then, while the abnormality of the CPU 711 is not resolved but the CPU 711 stops the output of the clear signal, because the monitor circuit 215 periodically transmits the reset signal to the abnormal-time connection instruction circuit 713, the transmission of the abnormal-time connection instruction signal to the latch IC 714 is continued.

On the other hand, when the CPU 711 returns to the normal state, the CPU 711 restarts the output of the clear signal, but the monitor circuit 215 does not output the reset signal. Therefore, the charge accumulated in the capacitor C122 is discharged, and the potential at the point P12 is gradually lowered. When the potential at the point P12 is less than a predetermined threshold, the transistor TR121 is turned off. Therefore, the input voltage at the set terminal of the latch IC

714 becomes the high level. That is, the transmission of the connection instruction signal to the latch IC 714 is stopped.

Because the latch IC 714 maintains the state in which the electric-power supply signal is output even after the transmission of the connection instruction signal is stopped, the state in which the supply of the electric power to the load 103 is continued.

As described above, during the transportation of the vehicle or the long-period parking, the power supply 102 can electrically be disconnected from the load 103 by controlling the latch IC 714 as needed basis, and the dark current from the power supply 102 to the load 103 can be prevented.

On the other hand, in the case that the abnormality is generated in the CPU 711, the power supply 102 is automatically electrically connected to the load 103, and the electric connection between the power supply 102 and the load 103 is automatically maintained, so that the impossibility of the supply of the electric power to the load 103 can be prevented. Therefore, for example, the situation in which the vehicle running is adversely affected because the information stored in the memory of the ECU of the vehicle is erased or because loads, such as the lamp and the wiper, which are connected to the ECU, are not driven can be avoided.

Unless the predetermined number of pulsed disconnection instruction signals is transmitted to the disconnection instruction integrating circuit 712, the disconnection instruction signal is not transmitted to the latch IC 714. Therefore, the false stop of the supply of the electric power to the load 103 due to the noise is prevented.

When the exceedance of the counter is generated predetermined times in the monitor circuit 215 while the predetermined number of pulsed reset signals is not transmitted to the abnormal-time connection instruction circuit 713, the abnormal-time connection instruction signal is not transmitted to the latch IC 714. Therefore, the false start of the supply of the electric power to the load 103 due to the noise is prevented.

The operation of the electric-power supply monitor circuit 312 is similar to that of the electric-power supply monitor circuit 312 of the power-supply management ECU 301 in FIG. 6.

3. Modifications

Modifications of the embodiments of the present invention will be described below.

For example, the power-supply management ECUs 201 to 501 are not necessarily provided with the keep relay 217 inside, but the keep relay 217 may be provided outside the power-supply management ECUs 201 to 501.

For example, the power-supply management ECU 701 is not necessarily provided with the switching circuit including the transistor TR101 and the MOSFET M101, but the switching circuit may be provided outside the power-supply management ECU 701. The latch IC 714 may be provided outside the power-supply management ECU 701.

In the power-supply management ECU 701, the electric-power supply monitor circuit 312 may not be provided.

In the first embodiment of the present invention, the two-winding type keep relay is used. Alternatively, any relay may be used, as long as the state of the contact is changed by transmitting a different kind of control signal (for example, the connection signal and the disconnection signal) and can be retained even if the transmission of the control signal is stopped. For example, a one-winding type keep relay may be used.

In the first embodiment of the present invention, by way of example, the keep relay 217 is set to the disconnection state after the CPU 212 or 311 outputs the plural pulsed disconnection instruction signals. Alternatively, for example, the keep relay 217 may immediately be set to the disconnection state once the CPU 212 or 311 outputs the disconnection instruction signal. Similarly, for example, the keep relay 217 may be set to the connection state once the monitor circuit 215 outputs the reset signal. On the other hand, for example, the keep relay 217 may be set to the connection state after the CPU 212 or 311 outputs the plural pulsed connection instruction signals.

In the second embodiment of the present invention, by way of example, the latch IC 714 stops the output of the electric-power supply signal after the CPU 711 outputs the plural pulsed disconnection instruction signals. Alternatively, for example, the latch IC 714 may stop the output of the electric-power supply signal once the CPU 711 outputs the disconnection instruction signal. Similarly, for example, the latch IC 714 may start the output of the electric-power supply signal once the monitor circuit 215 outputs the reset signal. On the other hand, for example, the latch IC 714 may start the output of the electric-power supply signal after the CPU 711 outputs the plural pulsed connection instruction signals.

In addition to the vehicle, one or more embodiments of the present invention can be applied to apparatuses and systems provided with a load or a component, which constant power feeding is usually performed and the power feeding is stopped in such special cases that the load or the component is not used for a long period.

One or more embodiments of the present invention can also be applied to the case that another switching part that switches the electric connection between the power supply and the load is controlled in addition to the relay or the combination of the latch IC and the switching element.

The sequence of pieces of processing can be performed by hardware or software. In the case that the sequence of pieces of processing is performed by the software, a program constituting the software is installed in a computer. At this point, examples of the computer include a computer incorporated in dedicated hardware and a general-purpose personal computer in which various functions can be performed by installing various programs.

The program executed by the computer may be a program in which the processing is performed in time series along the sequence of one or more embodiments of the present invention, a program in which the pieces of processing are concurrently performed, or a program in which the processing is performed in necessary timing when a call is received.

As used herein, the term of the system means the entire apparatus including plural apparatuses or means. That is, the system means a set of plural structural elements (such as apparatus and modules (components)), but all the structural elements are not necessarily included in the same casing. Accordingly, both plural apparatus, which are individually accommodated in the casings and connected through a network, and one apparatus in which plural modules are accommodated in one casing are the system.

The present invention is not limited to the above embodiments, but various changes can be made without departing from the scope of the present invention. While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A power-supply control device that controls supply of an electric power from a power supply of a vehicle to a load of the vehicle by controlling a switching part, the switching part switching electric connection between the power supply and the load, the switching part becoming a first state in which the power supply is electrically connected to the load when a first control signal is transmitted, the switching part becoming a second state in which the power supply is electrically disconnected from the load when a second control signal is transmitted, the switching part being able to retain the state even if the supply of the control signal is stopped, the power-supply control device comprising:
   a switching control circuit that transmits the first control signal and the second control signal to the switching part to control the state of the switching part;
   a monitor circuit that monitors existence or non-existence of an abnormality of the switching control circuit, and transmits a reset signal to the switching control circuit in order to reset the state of the switching control circuit when detecting the abnormality of the switching control circuit; and
   an abnormal-time connection circuit that transmits a third control signal to the switching part in order to set the switching part to the first state when the monitor circuit transmits the reset signal to the switching control circuit,
   wherein the reset signal is a pulsed signal, and
   wherein the abnormal-time connection circuit transmits the third control signal to the switching part after a plurality of pulsed reset signals are transmitted.

2. The power-supply control device according to claim 1, further comprising an electric-power supply monitor circuit that is connected between the switching part and the load, and transmits a signal, which indicates existence or non-existence of the electric power supplied from the power supply to the load, to the switching control circuit while the switching control circuit transmits a fourth control signal.

3. The power-supply control device according to claim 1, further comprising an automatic stopping circuit that is connected between the switching part and the load, and stops the third control signal output from the abnormal-time connection circuit using a voltage or a current, which is supplied from the switching part to the load.

4. The power-supply control device according to claim 1, further comprising the switching part.

5. The power-supply control device according to claim 1, wherein the switching part includes a relay that can retain a state of a contact even if the transmission of the control signal is stopped,
   wherein the first state is a state in which the relay electrically connects the power supply to the load, and
   wherein the second state is a state in which the relay electrically disconnects the power supply from the load.

6. The power-supply control device according to claim 5, wherein the switching control circuit includes:
   a connection circuit that is connected to the power supply, and supplies the electric power from the power supply to the relay as the first control signal when a fifth control signal is transmitted;
   a disconnection circuit that is connected to the power supply, and supplies the electric power from the power supply to the relay as the second control signal when a sixth control signal is transmitted; and
   a control part that controls the state of the relay by transmitting the fifth control signal to the connection circuit or transmitting the sixth control signal to the disconnection circuit.

7. The power-supply control device according to claim 6, wherein the sixth control signal is a pulsed signal, and
   wherein the disconnection circuit transmits the second control signal to the relay after the plurality of pulsed sixth control signals are transmitted.

8. The power-supply control device according to claim 1, wherein the switching circuit includes a keep relay that becomes the first state when the first control signal or the third control signal is transmitted to a connection-side coil, is able to retain the first state even if the transmission of the first control signal or the third control signal is stopped, becomes the second state when the second control signal is transmitted to a disconnection-side coil, and is able to retain the second state even if the transmission of the second control signal is stopped,
   wherein the first state is a state in which the keep relay electrically connects the power supply to the load, and
   wherein the second state is a state in which the keep relay electrically disconnects the power supply from the load.

9. The power-supply control device according to claim 8, wherein the keep relay becomes the first state when the control signal is simultaneously transmitted to the connection-side coil and the disconnection-side coil.

10. The power-supply control device according to claim 2, further comprising an automatic stopping circuit that is connected between the switching part and the load, and stops the third control signal output from the abnormal-time connection circuit using a voltage or a current, which is supplied from the switching part to the load.

11. The power-supply control device according to claim 10, further comprising the switching part.

12. The power-supply control device according to claim 11,
   wherein the switching part includes a relay that can retain a state of a contact even if the transmission of the control signal is stopped,
   wherein the first state is a state in which the relay electrically connects the power supply to the load, and
   wherein the second state is a state in which the relay electrically disconnects the power supply from the load.

13. The power-supply control device according to claim 4,
   wherein the switching part includes a relay that can retain a state of a contact even if the transmission of the control signal is stopped,
   wherein the first state is a state in which the relay electrically connects the power supply to the load, and
   wherein the second state is a state in which the relay electrically disconnects the power supply from the load.

14. The power-supply control device according to claim 4,
   wherein the switching circuit includes a keep relay that becomes the first state when the first control signal or the third control signal is transmitted to a connection-side coil, is able to retain the first state even if the transmission of the first control signal or the third control signal is stopped, becomes the second state when the second control signal is transmitted to a disconnection-side coil, and is able to retain the second state even if the transmission of the second control signal is stopped,
   wherein the first state is a state in which the keep relay electrically connects the power supply to the load, and
   wherein the second state is a state in which the keep relay electrically disconnects the power supply from the load.

* * * * *